(12) United States Patent
Shirakura et al.

(10) Patent No.: US 6,449,067 B2
(45) Date of Patent: *Sep. 10, 2002

(54) CARTRIDGE FOR HOLOGRAM-IMAGE RECORDING MEDIUM AND CARTRIDGE INCLUDING BRAKING MECHANISM

(75) Inventors: Akira Shirakura, Tokyo; Hirotsugu Suzuki, Chiba, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,931

(22) Filed: Jun. 28, 1999

(30) Foreign Application Priority Data

Jun. 30, 1998 (JP) .......................... 10-185254

(51) Int. Cl.⁷ .............................. G02B 1/04; G02B 1/30
(52) U.S. Cl. ............................. 359/35; 359/3; 359/22; 359/30
(58) Field of Search .................. 359/35, 3, 30, 359/22

(56) References Cited

U.S. PATENT DOCUMENTS 4,163,290 A * 7/1979 Sutherlin et al. ............ 359/2
4,946,258 A * 8/1990 Fisher et al. ............... 359/35
5,519,517 A * 5/1996 Redfield et al. ............. 359/22
5,608,485 A * 3/1997 Kataoka et al. ............. 396/514

* cited by examiner

Primary Examiner—Jon Henry
(74) Attorney, Agent, or Firm—Frommer Lawrence & Haug LLP; William S. Frommer; Grodon Kessler

(57) ABSTRACT

A cartridge for holding a hologram-image recording medium for use with a hologram-image recording apparatus, including locating means for properly positioning said cartridge, for sequentially exposing and recording interference fringes generated by an object laser beam modulated in accordance with each element image of parallax images and a reference laser beam having coherency with respect to the object laser beam is provided. The cartridge includes a light shielding case capable of shielding external light from inside the cartridge. The case also defines an unreeling opening. A core is positioned within the cartridge around which the hologram recording medium is wound. The hologram recording medium is unreeled from the core to an exposing and recording portion of the hologram-image recording apparatus through the unreeling opening when the cartridge is mounted on the hologram-image recording apparatus. A braking mechanism is coupled with the core to brake movement of the hologram-recording medium being unreeled by imparting a load on the core against movement of the hologram-recording medium.

20 Claims, 14 Drawing Sheets

PLAN VIEW SHOWING CARTRIDGE FOR HOLOGRAM-IMAGE RECORDING MEDIUM AND RECORDING-MEDIUM MOVING SYSTEM

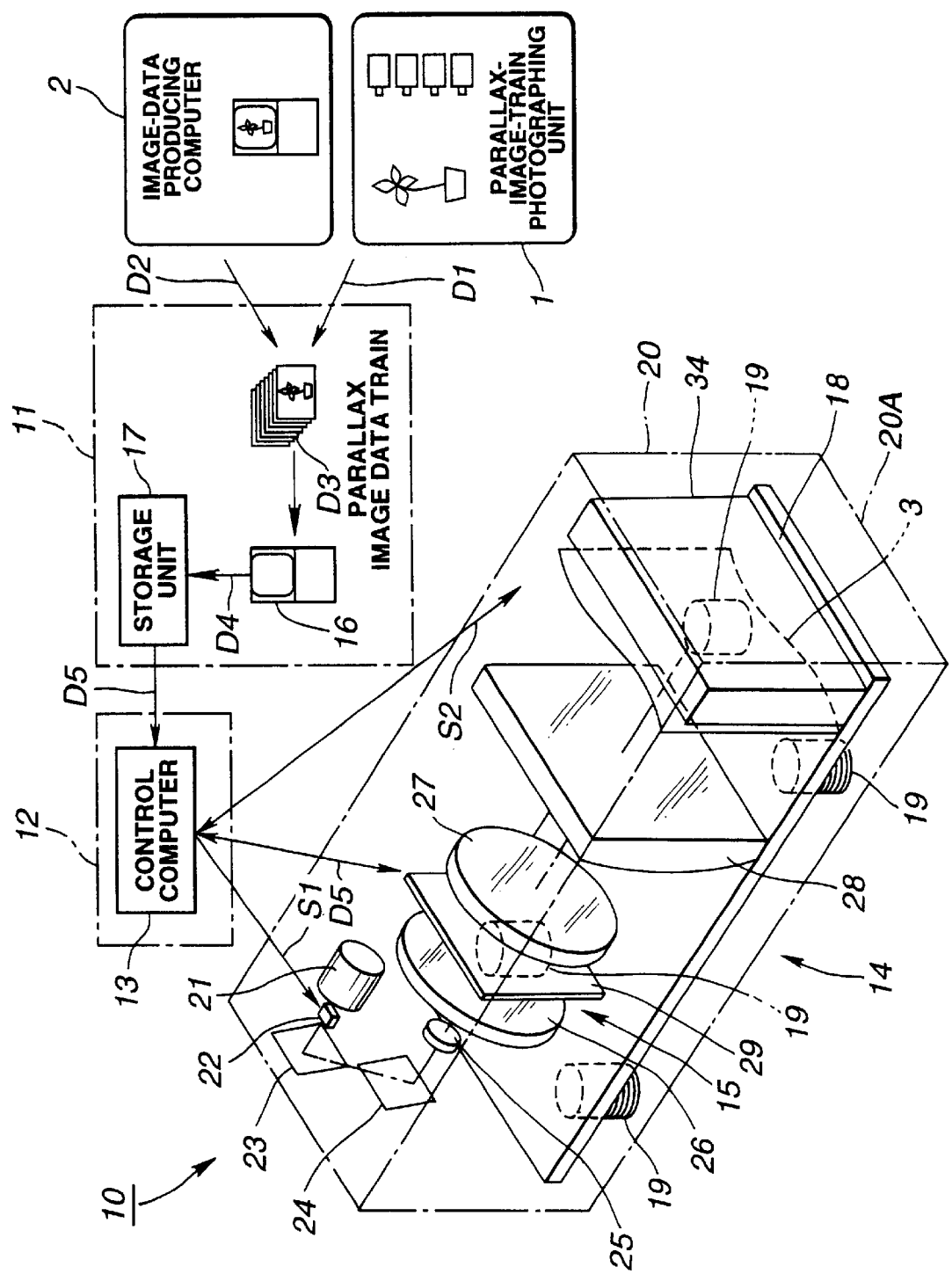
FIG.1 OVERALL STRUCTURAL VIEW SHOWING HOLOGRAPHIC-STEREOGRAM PRODUCING APPARATUS SCHEMATIC VIEW SHOWING OPTICAL SYSTEM OF HOLOGRAPHIC-STEREOGRAM PRODUCING APPARATUS PLAN VIEW SHOWING CARTRIDGE FOR
HOLOGRAM-IMAGE RECORDING MEDIUM AND
RECORDING-MEDIUM MOVING SYSTEM

SCHEMATIC VIEW SHOWING CARTRIDGE FOR HOLOGRAM-IMAGE RECORDING MEDIUM

FRONT VIEW SHOWING CARTRIDGE FOR HOLOGRAM-IMAGE
RECORDING MEDIUM AND RECORDING-MEDIUM FEEDING MECHANISM

PLAN VIEW SHOWING CARTRIDGE FOR HOLOGRAM-IMAGE RECORDING MEDIUM AND RECORDING-MEDIUM MOVING MECHANISM

FRONT VIEW SHOWING CARTRIDGE FOR HOLOGRAM-IMAGE
RECORDING MEDIUM AND RECORDING-MEDIUM MOVING MECHANISM

PLAN VIEW SHOWING CARTRIDGE FOR
HOLOGRAM-IMAGE RECORDING MEDIUM AND
RECORDING-MEDIUM MOVING MECHANISM

SCHEMATIC VIEW SHOWING CARTRIDGE
FOR HOLOGRAM-IMAGE RECORDING MEDIUM

SCHEMATIC AND PERSPECTIVE VIEW SHOWING
INDEX-MATCHING-SOLUTION SUPPLY MECHANISM

SCHEMATIC VIEW SHOWING CARTRIDGE
FOR HOLOGRAM-IMAGE RECORDING MEDIUM

SCHEMATIC VIEW SHOWING CARTRIDGE FOR HOLOGRAM-IMAGE RECORDING MEDIUM

SCHEMATIC VIEW SHOWING CARTRIDGE
FOR HOLOGRAM-IMAGE RECORDING MEDIUM

GRAPH SHOWING CHANGE IN
MOVEMENT SPEED OF RECORDING
MEDIUM AS TIME ELAPSES

CROSS SECTIONAL VIEW SHOWING ESSENTIAL
PORTION OF HOLOGRAM RECORDING MEDIUM

DIAGRAM SHOWING SENSITIZING PROCESS
OF PHOTOPOLYMERIZING PHOTOPOLYMER

SCHEMATIC VIEW SHOWING OPTICAL SYSTEM OF CONVENTIONAL HOLOGRAPHIC-STEREOGRAM PRODUCING APPARATUS

CARTRIDGE FOR HOLOGRAM-IMAGE RECORDING MEDIUM AND CARTRIDGE INCLUDING BRAKING MECHANISM

BACKGROUND OF THE INVENTION

This invention relates generally to a cartridge for holding a hologram-image recording medium. The cartridge is mounted on a hologram-image recording apparatus for producing holographic stereogram. The holographic stereogram is capable of producing a three-dimensional rendition of either a photograph or an image produced by a computer.

A holographic stereogram is produced by imaging two pictures of a single object obtained by sequentially photographing the object from different observing points. These two pictures are sequentially exposed and recorded on one hologram recording medium as a collection of oblong or dot shaped elements. A user can identify a two-dimensional image, including an aggregate of image information of a portion of the hologram, when the user looks at the holographic stereogram through one eye from a certain position. When the user looks at the holographic stereogram from another position, the user can see a two-dimensional image, including an aggregate of image information of another portion of the hologram. Therefore, when the user looks at the holographic stereogram with both eyes, the parallax between the two eyes causes the recorded hologram to be observed as a three-dimensional image.

Such a holographic stereogram can be produced by a holographic stereogram producing apparatus 100 shown in FIG. 17 (A). Holographic stereogram producing apparatus 100 includes a laser-beam source 101 for emitting a single wavelength laser beam L10 exhibiting excellent coherency, and a partial reflecting mirror 102 for splitting laser beam L10 into an object laser beam L11 and a reference laser beam L12. Optical elements 103 to 107 comprise an optical system for acting upon object laser beam L11, and a transmissive LCD display unit 108 is also provided for further acting upon object laser beam L11. Optical elements 109 to 111 comprise an optical system for acting upon reference laser beam L12. Finally, an electromotive stage 113 is provided for holding a hologram recording medium 112 upon which object laser beam L11 and reference laser beam L12 converge, and for moving hologram recording medium 112 as required.

The optical system for acting upon object laser beam L11 includes the following optical elements sequentially disposed along the optical axis of the path of object laser beam L11. A total reflection mirror 103 is first provided for changing the direction of beam L11. Beam L11 then passes through a first cylindrical lens 104 that diffuses beam L11 in a one dimensional direction. A collimator lens 105 receives beam L11 and forms beam L11 into a plurality of parallel laser beams. A projecting lens 106 and a second cylindrical lens 107 are also provided for guiding beam L11 to hologram recording medium 112. Display unit 108 is disposed along the light path of beam L11, and comprises a transmission type liquid crystal panel disposed between the collimator lens 105 and the projecting lens 106. Image data output from an image processing portion (not shown) is displayed on the display unit 108.

The optical system for acting upon reference laser beam L12 includes the following optical elements sequentially disposed along the optical axis of the path of reference laser beam L12. A cylindrical lens 109 is first provided for diffusing beam L12 in a one dimensional direction. Beam L12 the passes to a collimator lens 110 that forms diffused beam L12 into a plurality of parallel laser beams. A total reflection mirror 111 for changing the transmission direction of reference laser beam L12 to arrive at hologram recording medium 112 is also provided.

Hologram recording medium 112 comprises, for example, a photosensitive film. As shown in FIG. 17(B) as well as FIG. 17(A), medium 112 is held by an electromotive stage 113. When electromotive stage 113 is moved, medium 112 is intermittently moved as desired in a direction indicated by an arrow b.

During operation, laser beam L10 is emitted from laser-beam source 101 incident on half mirror 102, as shown in FIG. 17(A). Half mirror 102 splits laser beam L10 into object laser beam L11 and reference laser beam L12. Object laser beam L11 is incident on display unit 108 through first cylindrical lens 104 and collimator lens 105. When object laser beam L11 passes through display unit 108, object laser beam L11 is image-modulated in accordance with an image displayed on display unit 108. Modulated object laser beam L11 is incident on recording medium 112 after passing through projecting lens 106 and second cylindrical lens 107. Reference laser beam L12 is incident on recording medium 112 through the optical system composed of cylindrical lens 109, collimator lens 110 and total reflection mirror 111. Interference fringes generated between the reference beam and the modulated object beam are sequentially recorded in the form of oblong or dot shapes on recording medium 112. These recorded interference fringes form the hologram. Hologram recording medium 3 is structured as shown in FIG. 15, and is used for recording the hologram. Hologram recording medium 3 is a so-called film coating type recording medium incorporating a film base 4 in the form of a tape on which a photopolymer layer 5 composed of photopolymerization-type photopolymers is formed. The photopolymer layer 5 is then coated with a cover sheet 6.

Referring next to FIGS. 16(A)–16(C), the principle of exposing and recording a hologram on hologram recording medium 3 will be described. Photopolymerization-type photopolymers composing the photopolymer layer 5 of hologram recording medium include monomers M initially regularly dispersed among matrix polymers, as shown in FIG. 16 (A). When the photopolymerization-type photopolymers are irradiated with a laser beam LA having power of approximately 10 mJ/cm2 to 400 mJ/cm2, monomers M are polymerized into polymers in the exposed portion, as shown in FIG. 16(B). As the polymerization of the photopolymerization-type photopolymers proceeds, the refractive index between the exposed portions and the non-exposed portions is modulated in accordance with the resulting nonuniformity of the concentration of monomers M caused from movement of monomers M upon exposure. Thereafter, the surface of the photopolymerization-type photopolymers is irradiated with ultraviolet rays or visible light LB having power of about 1000 mJ/cm2 so that polymerization of the monomers M is completed and the position of the monomers are fixed as shown in FIG. 16(c). The refractive index of the photopolymerization-type photopolymers which constitute the photopolymer layer 5 has therefore been changed by the incident laser beam LA. In this manner, interference fringes generated between an object laser beam and a reference laser beam are exposed and recorded on the hologram recording medium 3.

The holographic stereogram producing apparatus 100 depicted in FIGS. 17(A) and 17(B) uses a recording medium such as hologram recording medium 3 of FIG. 15. One of the benefits of such a recording medium is that no special developing process is required after the exposing process has been performed. Thus, the structure of holographic stereogram producing apparatus 100 can be simplified because a developing unit and so forth can be omitted. Moreover, a holographic stereogram can quickly be produced.

Because hologram recording medium 3 incorporates the photopolymer layer 5 constituted by the photopolymerization-type photopolymers, exposure of the recording medium to light has a detrimental effect on the recording medium, and may sensitize the recording medium. Therefore, hologram recording medium 3 must be loaded into the holographic stereogram producing apparatus 100 in the dark. Complicated handling must be performed to insure that light does not reach the recording medium during loading. Moreover, holographic stereogram producing apparatus 100 must also move the recording medium to the exposing and recording portion in the dark.

Vibrations felt by holographic stereogram producing apparatus 100 cause problems during recording. When small vibrations on the order of the wavelength of laser beam L10 are exerted on the recording medium 112, the interference fringes which are to be sequentially exposed and recorded on recording medium 112 become unstable. Thus, a portion of the hologram to be recorded will have its diffraction efficiency and brightness deteriorated. When larger vibrations are felt by holographic stereogram producing apparatus 100, recording of the hologram on recording medium 112 cannot be performed. When portions of the hologram have been exposed and recorded on the recording medium 112 when the diffraction efficiency is unsatisfactorily low because of vibrations, these portions of the hologram will be reproduced as a darker image. Thus, uniformity of the image deteriorates.

Therefore, holographic stereogram producing apparatus 100 is generally provided with a vibration isolator for isolating external vibrations and quickly attenuating vibrations so that recording can be properly performed. The vibration isolator typically comprises an air damper or springs appropriately disposed between a substrate on which laser-beam source 101 and the optical elements constituting the optical hologram recording system are mounted and the housing of the apparatus.

While prevention of external vibrations is important, it is equally important for holographic stereogram producing apparatus 100 to prevent vibrations of recording medium 112 relative to the optical elements which may be generated by the apparatus for holding and moving recording medium 112. Recording medium 112 must be securely held to prevent small vibrations similar in size to the wavelength of laser beam L10 during recording of the hologram on recording medium 112. When a portion of the hologram has been recorded on recording medium 112, the guide means and the moving means recording medium 112 must be quickly moved so that other portions can be recorded. When the movement of recording medium 112 is stopped, vibrations created during movement must be quickly damped. In a conventional holographic stereogram producing apparatus about two seconds have been required for damping vibrations created by the movement of recording medium 112 before recording thereon can be performed. As a result, the production time of one holographic stereogram is increased.

Therefore, another conventional holographic stereogram producing apparatus is provided with a moving mechanism incorporating a guide and a moving apparatus in place of electromotive stage 113 for preventing vibrations of the hologram recording medium 112. The recording medium is disposed on two parallel rollers each having a predetermined tension imparted thereon by a torsion coil spring or the like. The object laser beam and the reference laser beam are incident on the recording medium while an optical element is in direct contact against the recording medium. Only ¼ of the time is required for damping vibrations created by the movement of the recording medium. However, such a guide and a moving apparatus require complicated structures. Additionally, because the optical element is maintained in contact with the recording medium, the optical element may be worn and damaged. As a result, maintenance of the holographic stereogram producing apparatus is required after it has produced a predetermined number of holographic stereograms. The optical elements are removed, polished, and remounted in the apparatus, or new elements are used. However, because the optical elements must be perfectly aligned, this maintenance cannot be easily performed.

In yet another conventional holographic stereogram producing apparatus another mechanism for moving the recording medium that does not employ a torsion coil spring is used. Rather, a motor constantly inversely rotates a slip member. The force of these rotations are transmitted to one of a plurality of parallel rollers so as to generate a predetermined torque thereon for moving the recording medium. However, the motor in this design is rotated during recording, creating internal vibrations. The quality of the produced holographic stereogram deteriorates because of these vibrations.

Another problem encountered by a conventional holographic stereogram producing apparatus is that dust may enter the apparatus and adhere to the recording medium. This dust can reduce the clarity of the recording of the hologram. Therefore, the conventional holographic stereogram producing apparatus is provided with a cleaning member for cleaning the recording medium. The cleaning member comprises, for example, unwoven fabric which slides on the surface of the recording medium 112 so as to wipe and remove dust and the like adhered to the surface. To allow for proper cleaning, the cleaning member is changed after a predetermined number of holographic stereogram have been produced. The holographic stereogram producing apparatus must be opened to change the cleaning member. When opened, light entering the apparatus may undesirably expose the recording medium.

Furthermore, the conventional holographic stereogram producing apparatus is provided with a mechanism for supplying index matching solution between the hologram recording medium and the optical element to assist in matching the refractive indexes thereof to reduce reflections of light. Since this index matching solution is used up during use of the apparatus when recording holograms, the index matching solution must be replenished by opening the holographic stereogram producing apparatus.

Therefore, it would be beneficial to provide an improved system for recording holograms that overcome the drawbacks of the prior art.

OBJECTS OF THE INVENTION

Accordingly, it is an object of the invention to provide a light shielding cartridge for loading into a hologram recording apparatus that accommodates a hologram recording medium.

It is another object of the invention to provide an improved hologram recording apparatus that allows for reduced vibrations, ease of use and ease of maintenance.

A still further object of the invention is to provide an improved hologram recording apparatus that employs a cartridge for holding, advancing and cleaning a recording medium, and that reduces internal vibrations of the hologram recording apparatus.

Still other objects and advantages of the invention will in part be obvious and will in part be apparent from the specification and drawings.

SUMMARY OF THE INVENTION

Generally speaking, in accordance with the invention, a cartridge for holding a hologram-image recording medium is arranged to be mounted on a hologram-image recording apparatus. The cartridge allows for sequentially recording interference fringes produced by a modulated object laser beam and a reference laser beam on a hologram recording medium. The cartridge comprises a light shielding case capable of shielding external light, and accommodating a core around which an elongated hologram recording medium is wound. During use, the hologram recording medium is unreeled from the cartridge to be properly positioned at a recording portion of the recording apparatus through an opening provided in the light shielding case.

The cartridge may be further provided with an optical element formed integral therewith for guiding movement of the hologram recording medium. The cartridge for a hologram-image recording medium is provided with a plurality of elements that normally require maintenance, such as a cleaning surface or the like. Rather performing such maintenance, upon using up all of the recording medium, a new cartridge is inserted, and including all new elements that otherwise would require maintenance. Thus, maintenance that risks improperly exposing the recording medium need not be performed.

The cartridge for a hologram-image recording medium may also be provided with a braking apparatus for exerting a load on the hologram recording medium against the direction of movement. This reduces vibrations generated during movement.

The invention accordingly comprises the several steps and the relation of one or more of such steps with respect to each of the others, and the apparatus embodying features of construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 1 schematically depicts the overall structure of a holographic-stereogram producing apparatus constructed in accordance with the invention;

FIG. 16 is a diagram showing a sensitization process of the hologram recording medium of FIG. 15, in which

DETAILED DESCRIPTION OF THE PREFERRED EMBODIMENTS

Figures 2A, 2B:
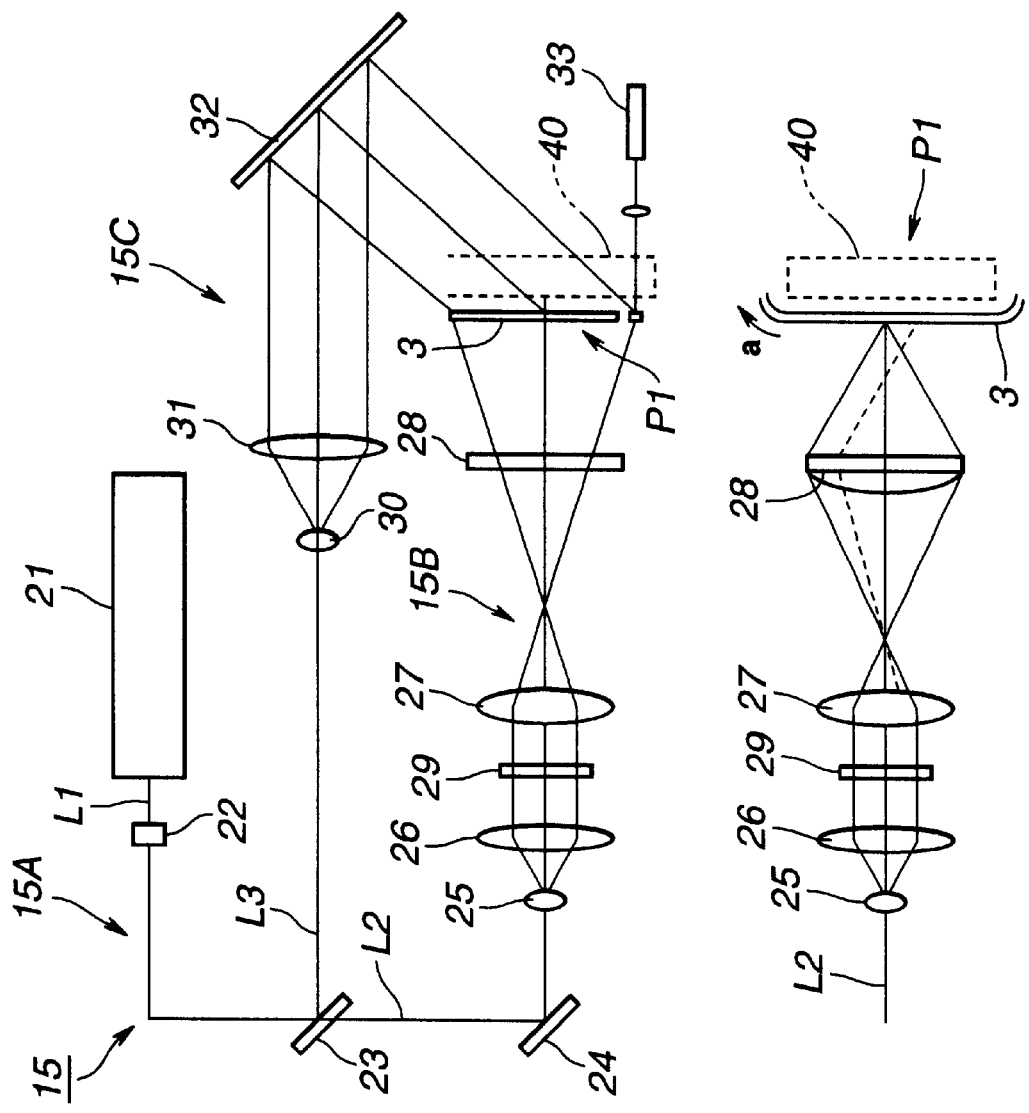
FIGS. 2(A) and 2(B) schematically depicts an optical system of the holographic-stereogram producing apparatus of FIG. 1.
Figure 3:
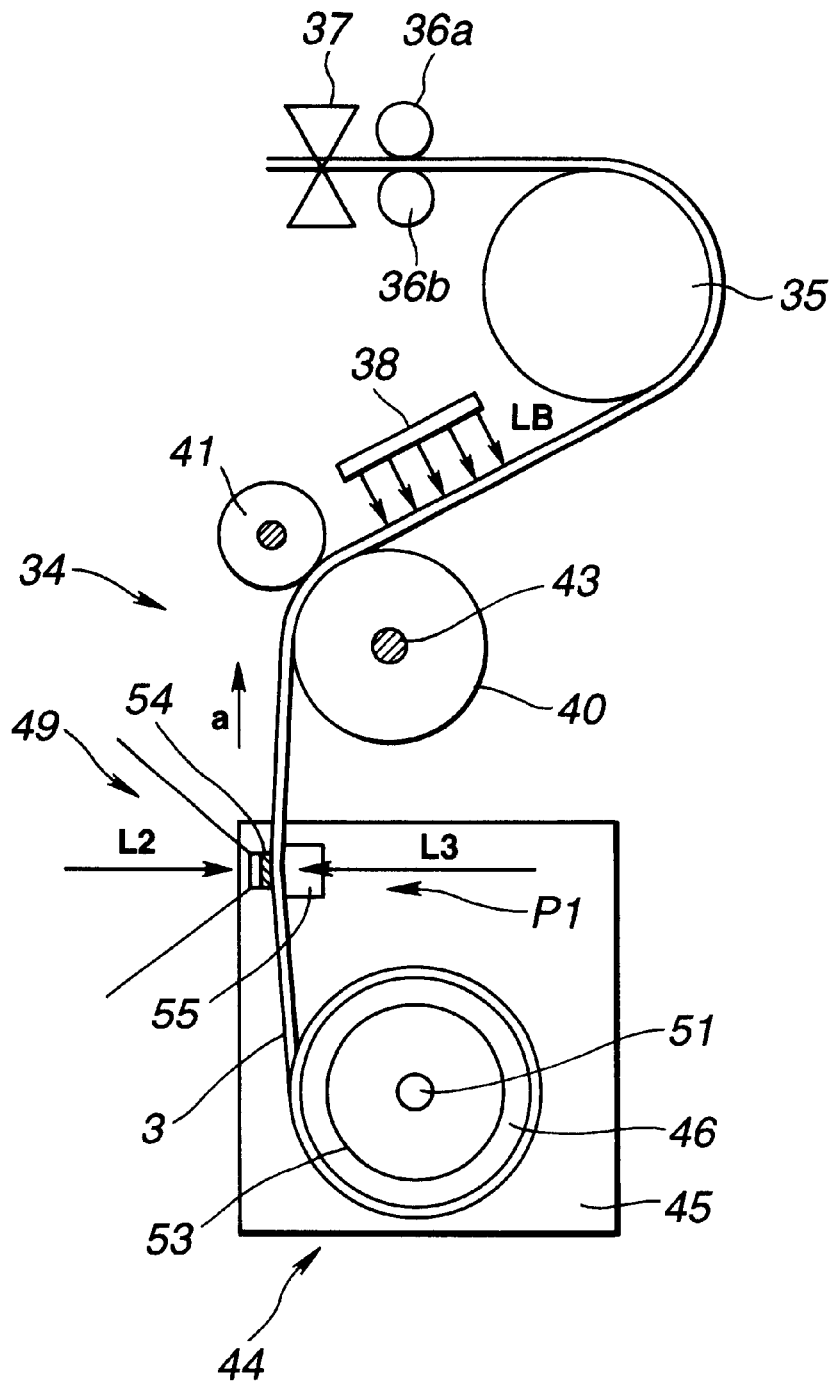
FIG. 3 is a plan view showing a cartridge for holding a hologram-image recording medium constructed in accordance with the invention including a recording-medium moving system loaded in the holographic-stereogram producing apparatus of FIG. 1.
Figure 15:
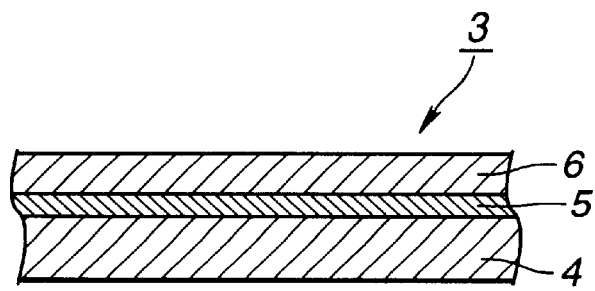
FIG. 15 a cross sectional view of a hologram recording medium for use in the holographic-stereogram producing apparatus of the invention.
Figure 16A:
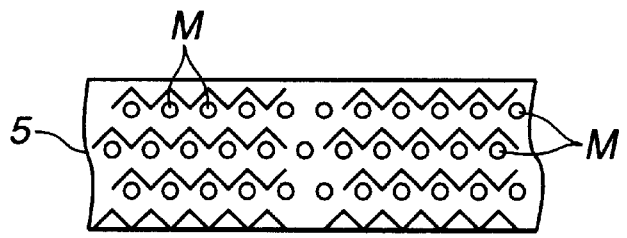
FIG. 16(A) shows an initial state.
Figure 16B:
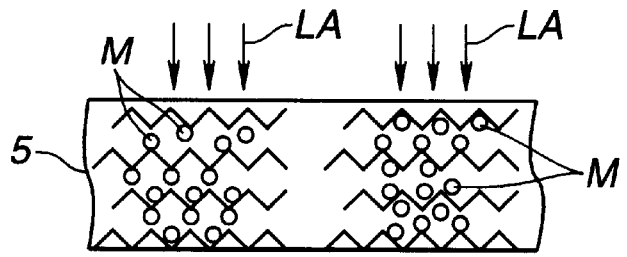
FIG. 16(B) shows an exposed state and FIG. 16(C) shows a fixing state.
Figure 16C:
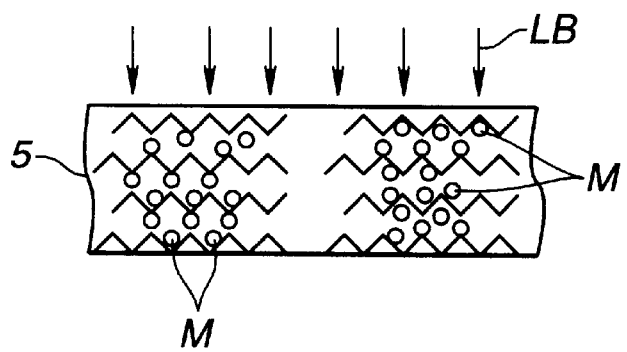
Figures 17A, 17B:
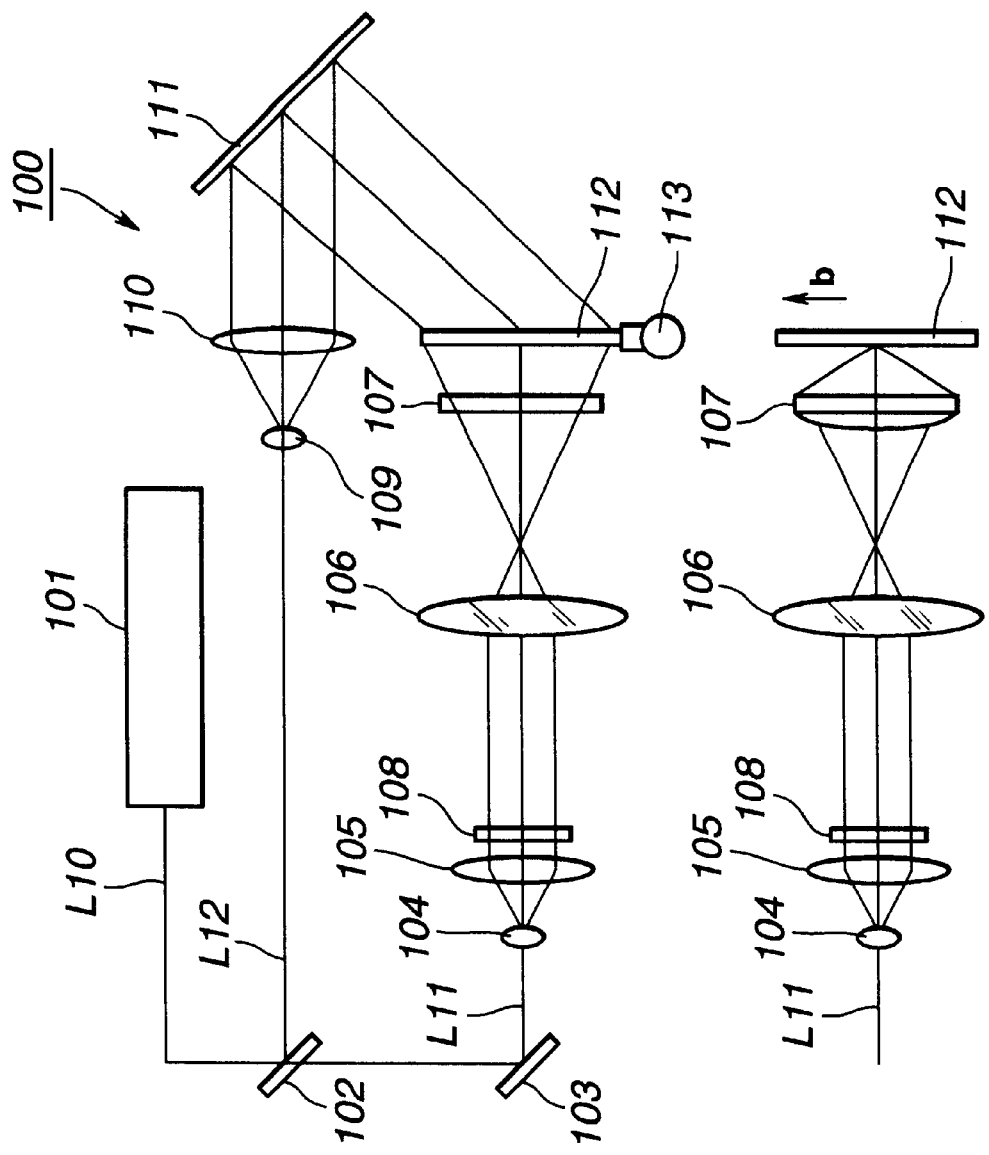
FIGS. 17(A) and 17(B) depict an optical system of a conventional holographic-stereogram producing apparatus.

Referring first to FIGS. 1–3, a holographic-stereogram producing apparatus 10 is provided, and which employs a cartridge 44 for holding and providing a hologram-image recording medium. Holographic-stereogram producing apparatus 10 includes an exposing and recording portion P1 (FIG. 2). An object laser beam L2 and a reference laser beam L3 are projected incident on a recording medium positioned in this area P1. Interference fringes produced between object laser beam L2 and reference laser beam L3 are recorded on a hologram recording medium 3 such as that previously shown in FIG. 15, and a holographic stereogram is produced. As is further shown in FIG. 3, recording medium 3 is discharged from cartridge 44 prior to having information recorded thereon, and is then intermittently moved by a recording-medium feeding mechanism 34. Holographic-stereogram producing apparatus 10 incorporates an image-data processing portion 11 for processing image data which is to be recorded; a control unit 12 having a control computer 13 for controlling the overall operation of the apparatus; and a holographic-stereogram producing portion 14, including an optical system 15 for producing holographic stereogram.

Image-data processing portion 11 includes an image-processing computer 16 and an associated storage unit 17. Image-data processing portion 11 produces a parallax image data train D3 in accordance with element hologram image data, such as a multiplicity of photographed image data items D1 including parallax information supplied from a parallax-image-train photographing unit 1 incorporating a multiple-lens camera or a movable camera and a plurality of computer image data items D2 including parallax information produced by the image-data producing computer 2. Photographed image data items D1 are generated by simultaneous photographing of an object from more than one position using the multiple-lens camera or taking successive photographs with the movable camera. The photographed image data items D1 include parallax information. The computer image data items D2 consist of a plurality of image data items including parallax information produced by, for example, a CAD (Computer Aided Design) apparatus or CG (Computer Graphics) apparatus.

Image-processing computer 16 of image-data processing portion 11 subjects parallax image data train D3 to a predetermined image process to prepare the data to produce a holographic stereogram resulting in hologram image data D4. Hologram image data D4 is temporarily stored in a storage unit 17, such as a memory of a computer or a hard disc apparatus. When an element of a hologram image is to be recorded on hologram recording medium 3, image-data processing portion 11 sequentially reads element-hologram image data items D5 for one image so as to transmit element-hologram image data items D5 to control computer 13 of control unit 12. Control computer 13 controls holographic-stereogram producing portion 14 to sequentially expose and record the image on hologram recording medium 3, based on element-hologram image data items D5 supplied from image-data processing portion 11.

In holographic-stereogram producing portion 14, each member of optical system 15 is supported on a common support substrate 18. Support substrate 18 is in turn supported by a case 20, dampers 19 being positioned therebetween. Optical system 15 includes an incident-laser-beam optical system 15A, an object-laser-beam optical system 15B and a reference-laser-beam optical system 15C (FIGS. 2(A) and 2(B)). The optical paths of object-laser-beam optical system 15B and reference-laser-beam optical system 15C are of the same length so that light from each reaches exposing and recording portion P1 at the same time in order to enhance coherency of object laser beam L2 and reference laser beam L3. Case 20 shields external light from at least optical system 15 and recording medium 3.

Incident-laser-beam optical system 15A includes a laser beam source 21 for emitting a laser beam L1; a shutter mechanism 22 for passing or restricting laser beam L1; and a half reflective mirror 23 for splitting laser beam L1 into object laser beam L2 and reference laser beam L3. The laser beam source 21 comprises a standard laser-beam apparatus, such as a semiconductor excited YAG laser beam apparatus, an air-cooled argon-ion laser beam apparatus or an air-cooled krypton laser beam apparatus, which emits laser beam L1 of a single wavelength and exhibiting satisfactory coherency.

Shutter mechanism 22 is opened/shut in accordance with control output S1 from control computer 13 in synchronization with the output timing of element-hologram image data items D5. Half mirror 23 splits incident laser beam L1 into a transmissive laser beam and a reflection laser beam. The transmissive laser beam of the beam L1 is used as object laser beam L2, while the reflection laser beam is used as reference laser beam L3. Object laser beam L2 and reference laser beam L3 are incident on corresponding object-laser-beam optical system 15B and reference-laser-beam optical system 15C disposed downstream of half mirror 23. The incident-laser-beam optical system 15A may be further provided with a total reflection mirror or the like (not shown) for the purpose of changing a direction of transmission of laser beam L1 as necessary to insure that the lengths of the optical paths for object laser beam L2 and reference laser beam L3 are the same. Shutter mechanism 22 may be a mechanically operated shutter member or an electronic shutter having an acoustic-optic modulator.

Object-laser-beam optical system 15B includes the following optical elements sequentially disposed along the optical axis in the direction of light transmission: a total reflecting mirror 24, a expanding lens 25, a collimator lens 26, a projection lens 27 and a second cylindrical lens 28. Expanding lens 25 is formed by combining a convex lens and a pin hole. Thus, object laser beam L2 that has penetrated half mirror 23 and which has been reflected by total reflecting mirror 24 is diffused into one dimension, corresponding to the width of the display surface of a transmission-type liquid crystal display unit 29 (described below).

After being diffused by expanding lens 25, collimator lens 26 forms object laser beam L2 into a plurality of parallel laser beams and guides the plurality of parallel laser beams to transmission-type liquid crystal display unit 29. Projection lens 27 projects object laser beam L2 to second cylindrical lens 28. Second cylindrical lens 28 converges object laser beam L2 to be forwarded to recording portion P1.

In object-laser-beam optical system 15B, transmission-type liquid crystal display unit 29 is disposed between collimator lens 26 and projection lens 27. Element hologram images are sequentially displayed on transmission-type liquid crystal display unit 29 in accordance with the element-hologram image data items D5 output from control computer 13. In synchronization with an output timing of the element-hologram image data items D5, control computer 13 transmits movement output S2 to a recording-medium feeding mechanism 34 (described below) to control the feeding of the hologram recording medium 3, as desired.

In optical system 15B, object laser beam L2 is diffused by expanding lens 25. Object laser beam L2 is incident on collimator lens 26 so as to be formed into a plurality of parallel laser beams. Object laser beam L2, incident on transmission-type liquid crystal display unit 29 after passing through collimator lens 26 is image-modulated in accordance with element hologram images displayed on liquid crystal display unit 29. Object laser beam L2 is then incident on second cylindrical lens 28 after passing through projection lens 27. Object laser beam L2 is then incident on hologram recording medium 3 in exposing and recording portion P1 so as to record object laser beam L2 on recording medium 3.

Reference-laser-beam optical system 15C includes a cylindrical lens 30, a collimator lens 31 and a total reflecting mirror 32 sequentially positioned along the optical path of reference laser beam L3. Cylindrical lens 30 is formed by combining a convex lens and a pin hole. Cylindrical lens 30 diffuses reference laser beam L3 reflected and split by the half mirror 23 in a one-dimensional direction to correspond to a predetermined width of the display surface of transmission-type liquid crystal display unit 29. Collimator lens 31 forms reference laser beam L3 diffused by cylindrical lens 30 into a plurality of parallel laser beams. Total reflecting mirror 32 reflects reference laser beam L3 to guide the reference laser beam L3 to a position incident on the rear of hologram recording medium 3.

Although shutter mechanism 22 (described above) is located to operate within incident-laser-beam optical system 15A, other structure may be employed. For example, shutter mechanisms may be disposed adjacent hologram recording medium 3 located to operate within object-laser-beam optical system 15B and reference-laser-beam optical system 15C, respectively.

Optical system 15 structured as described above is formed such that the lengths of the optical paths in object-laser-beam optical system 15B and reference-laser-beam optical system 15C for object laser beam L2 and reference laser beam L3 split by the half mirror 23 are substantially the same. Therefore, coherency of the object laser beam L2 and reference laser beam L3 in optical system 15 can be improved, thus improving the resolution of the recorded hologram.

Optical system 15 is provided with an interference-fringe detection portion 33 for interrupting exposing and recording of hologram recording medium 3 (FIG. 2(A)) when satisfactory holographic stereogram cannot be produced as a result of vibrations or the like. Interference-fringe detection portion 33 detects the quality of interference fringes formed by object laser beam L2 and reference laser beam L3. Interference-fringe detection portion 33 may comprise, for example, a CCD (Charge Coupled Device) camera. Interference-fringe detection portion 33 detects fluctuations of the interference fringes formed in a detection region which is different from the region in which hologram recording medium 3 is positioned.

When interference-fringe detection portion 33 detects fluctuation in the interference fringes exceeding a predetermined level, interference-fringe detection portion 33 transmits a detection output to control computer 13. Control computer 13 then closes shutter mechanism 22, interrupting production the holographic stereogram. When fluctuations in the detected interference fringes drop below a predetermined level, the detection output to control computer 13 is stopped, and normal operation of shutter mechanism 22 resumes to produce the holographic stereogram. Therefore, bright holographic stereogram exhibiting excellent diffraction efficiency can be produced.

Although interference-fringe detection portion 33 is depicted positioned disposed adjacent to hologram recording medium 3, it can be positioned elsewhere. For example, a mirror (complete or half reflective) or the like may be provided so as to guide portions of object laser beam L2 and the reference laser beam L3 to the interference-fringe detection portion 33 positioned at a different location. Another structure may be employed in which a portion of laser beam L1 is directly employed to form interference fringes for detecting vibrations. Interference-fringe detection portion 33 may be further provided individually from optical system 15 so that interference fringes produced by the optical system are used to detect vibrations.

Holographic-stereogram producing apparatus 10 is provided with the recording-medium feeding mechanism 34 (FIG. 3). Recording-medium feeding mechanism 34 intermittently feeds hologram recording medium 3 as it is unreeled from within cartridge 44 in a direction indicated by an arrow "a" shown in FIGS. 2(B) and 3. Hologram recording medium 3 is fed for a distance corresponding to one element hologram at each intermittent movement step in accordance with the movement output S2 command signal transmitted from control computer 13. Shutter mechanism 22 of holographic-stereogram producing apparatus 10 is operated in accordance with the control output S1 so that the optical path for the laser beam L1 is opened.

As shown in FIG. 1, the elements of the optical system 15 of holographic-stereogram producing apparatus 10 are mounted on a support substrate (an optical surface plate) 18 comprising an aluminum or aluminum alloy plate. If vibrations or the like are felt by holographic-stereogram producing apparatus 10 from outside the apparatus, object laser beam L2 and reference laser beam L3 would not be stably incident on hologram recording medium 3. Therefore, satisfactory interference fringes would not be produced for recording on hologram recording medium 3. Holographic-stereogram producing apparatus 10 therefore incorporates a plurality of dampers 19 for supporting the support substrate 18 to prevent the influence of such vibrations. Each of dampers 19 comprises an elastic member, for example, an air spring, rubber or a coil spring (not shown). One end of each damper 19 is joined to hold support substrate 18, while the other end is secured to a base member 20A of case 20 of the apparatus. Dampers 19 restrain external vibrations exerted on the optical system 15 that are smaller than the wavelength (about 1 $\mu$m) of the laser beam L1, preferable ⅕ of the wavelength or smaller. As a result, object laser beam L2 and reference laser beam L3 are provided incident on hologram recording medium free from fluctuations. Thus, holographic-stereogram producing apparatus 10 is able to produce bright holographic stereogram exhibiting an excellent diffraction efficiency.

As is shown in FIG. 3, recording-medium feeding mechanism 34 moves hologram recording medium 3 as it is unreeled from within cartridge 44 along the recording medium moving system. Hologram recording medium 3 is initially wound around a core 46 that is rotatively disposed in cartridge 44. Recording medium 3 is unreeled through a first unreeling opening 48 in cartridge 44. The recording-medium moving system incorporates recording-medium feeding mechanism 34, a heat roller 35, a pair of discharge rollers 36a and 36b, a cutter 37 and so forth so as to form a path therethrough for recording medium 3 into an S-like shape. The recording-medium moving system is provided with an ultraviolet-ray lamp 38 between recording-medium feeding mechanism 34 and heat roller 35.

Figure 5:
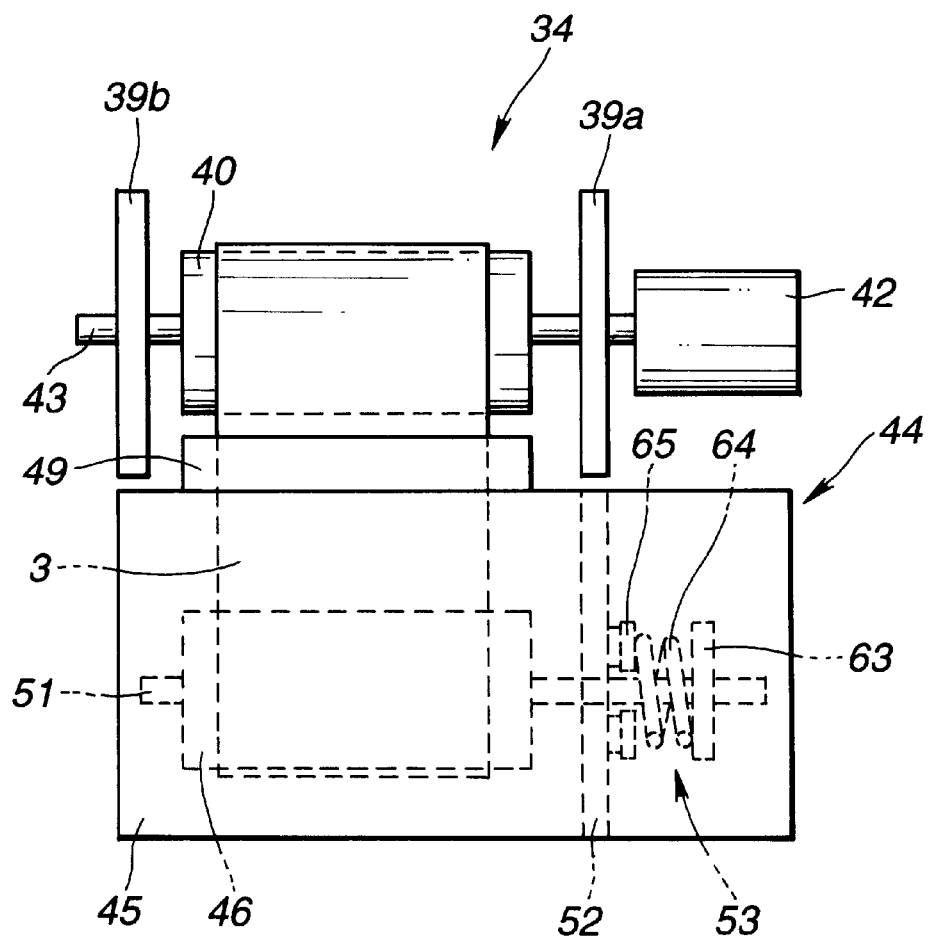
FIG. 5 is an elevational view showing the cartridge of FIG. 3 loaded into the holographic-stereogram producing apparatus of FIG. 1, and further depicts a recording-medium feeding mechanism including a braking mechanism provided at an end of a core upon which the recording medium is wound.

As shown in FIG. 5 in addition to FIG. 3, recording-medium feeding mechanism 34 incorporates a drive roller 40 positioned between a pair of frames 39a and 39b disposed opposing each other; a pinch roller 41 which is rotated in synchronization with the drive roller 40; and a stepping motor 42. Drive roller 40 is secured to a drive shaft 43 that is rotatably supported by frame 39a and 39b. An end of drive shaft 43 intermittently rotated by stepping motor 42. The outer surface of drive roller 40 and pinch roller 41 hold and intermittently feed hologram recording medium 3.

Heat roller 35 is positioned downstream from the recording portion of the apparatus and drive roller 40 in the feed direction of the recording medium. Hologram recording medium 3 is wound around the outer surface of heat roller 35 at a winding angle of approximately 180°. Heat roller 35 includes a heater (not shown) to maintain the temperature of heat roller 35 at about 120° C. Thus, after recording, heat roller 35 heats hologram recording medium 3 to raise the degree of modulation of the refractive index of the photopolymer layer thereof.

Discharge rollers 36a and 36b are intermittently rotated in synchronization with drive roller 40 by a stepping motor (not shown). Discharge rollers 36a and 36b intermittently move hologram recording medium 3 a distance corresponding to one element of a hologram after recordation of each element image has been completed. Therefore, hologram recording medium 3 is properly moved through exposing and recording portion P1.

Cutter 37 is also operated in accordance with the movement output S2 transmitted from control unit 12. Cutter 37 cuts hologram recording medium 3 after a predetermined length has passed therethrough to form a single, distinct hologram image. Therefore, holographic-stereogram producing apparatus 10 discharges a portion of hologram recording medium 3 in which the hologram image has been exposed and recorded as one holographic stereogram image.

Ultraviolet-ray lamp 38 is disposed along the path of travel of recording medium 3 between drive roller 40 and heat roller 35. Ultraviolet-ray lamp 38 emits ultraviolet rays LB having power of approximately 1000 mJ/cm2 to hologram recording medium 3, and polarization of monomers M in the matrix polymer is completed.

During operation, control computer 13 of control unit 12 transmits the movement output signal S2 to move the recording medium a distance corresponding to one element hologram. Thus, stepping motor 42 is rotated so that drive roller 40 rotated for a corresponding predetermined angular degree so that a non-exposed portion of the recording medium is moved to a position corresponding to the exposing and recording portion P1.

Shutter mechanism 22 is opened once the non-exposed portion of the recording medium is properly positioned. At this time, object laser beam L2 which has been imagemodulated, and reference laser beam L3 are incident on hologram recording medium 3 positioned at exposing and recording portion P1, and interference fringes corresponding to the element hologram image are exposed and recorded. After exposing and recording of this one element is completed, hologram recording medium 3 is moved once again. These operations are sequentially performed so that a holographic stereogram is produced.

Figure 4:
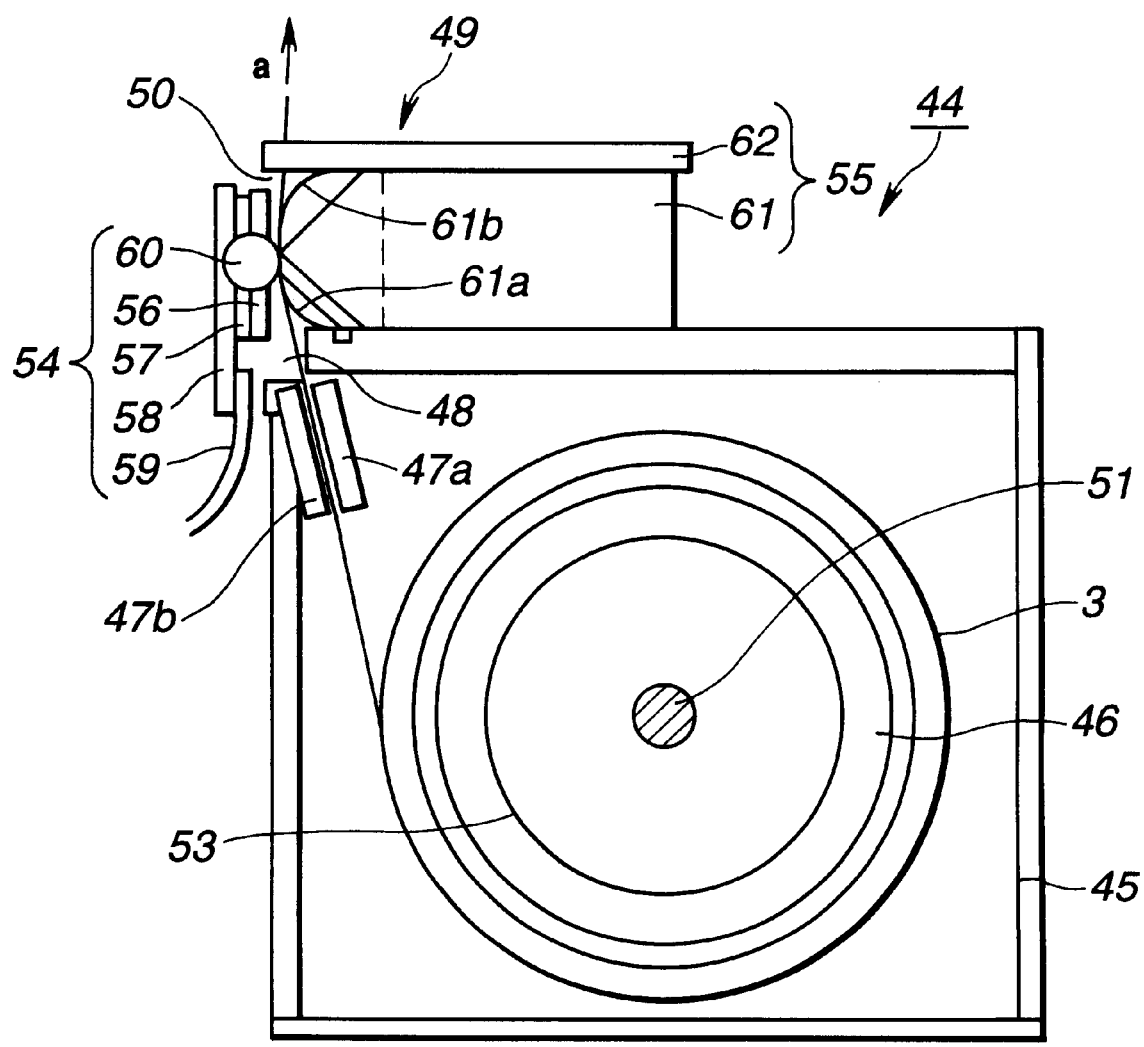
FIG. 4 depicts the cartridge of FIG. 3 loaded into the holographic-stereogram producing apparatus of FIG. 1.

As is shown in FIG. 4, cartridge 44 includes a light shielding cartridge case 45; core 46 which is rotatably supported in light shielding cartridge case 45 and around which the hologram recording medium 3 is wound; and a pair of cleaning felt members 47a and 47b for cleaning hologram recording medium 3 as it exists cartridge 44 through a first unreeling opening 48. Cartridge 44 is also provided with an exposing and recording unit 49 disposed on the outside of light shielding cartridge case 45 in a position corresponding to first unreeling opening 48. Thus, hologram recording medium 3 is moved sequentially from first unreeling opening 48 to exposing and recording unit 49 during operation. After hologram recording medium 3 has passed through the exposing and recording unit 49, hologram recording medium 3 is moved through a second unreeling opening 50 to recording-medium feeding mechanism 34.

Core 46 is fixed to a support shaft 51 rotatably supported in light shielding cartridge case 45. Support shaft 51 is provided with a braking mechanism 53 disposed at an end of the support shaft 51 which projects over a partition plate 52 disposed in the light shielding cartridge case 45 (FIG. 5). Cleaning felt members 47a and 47b are disposed in light shielding cartridge case 45 adjacent first unreeling opening 48, and hold the overall width of hologram recording medium 3 to wipe and remove dust and so forth from the surface thereof of the as it is unreeled from light shielding cartridge case 45. Moreover, light is stopped from entering cartridge 44 through first unreeling opening 48.

Exposing and recording unit 49 includes an object-laserbeam incident unit 54 and a reference-laser-beam incident unit 55. Exposing and recording unit 49 holds hologram recording medium 3 when it is to be exposed and recorded upon. Object-laser-beam incident unit 54 incorporates a louver film 56, a one-dimensional diffusion plate 57, a transmissive substrate 58, a leaf spring 59 and a spacer 60.

Louver film 56 is formed of an optical element having fine louver shape lattice. Either surface of louver film 56 is brought into contact with either surface of hologram recording medium 3. Louver film 56 prevents reference laser beam L3 which has passed through penetrated hologram recording medium 3 from being reflected by one-dimensional diffusion plate 57 back onto recording medium 3, preventing the recording of unintended interference fringes. Onedimensional diffusion plate 57 diffuses incident object laser beam L2 in the direction of each element hologram that is to be exposed and recorded on hologram recording medium 3. One of the surfaces of the one-dimensional diffusion plate 57 is integrally bonded with the surface of the louver film 56 not positioned in contact with the recording medium. Onedimensional diffusion plate 57 imparts a vertical angle of visibility to the holographic stereogram Transmissive substrate 58 is a solid member formed of a transparent material, such as glass or transparent plastic having an appropriate thickness. Louver film 56 and one-dimensional diffusion plate 57 are integrally joined to transmissive substrate 58. Object laser beam L2 is made incident on transmissive substrate 58 from the side thereof that does not have other elements bonded thereto.

Reference-laser-beam incident unit 55 includes a lightguiding block member 61 and a light-shielding substrate 62 for stopping the transmission of light other than reference laser beam L3. Similarly to transmissive substrate 58, lightguiding block member 61 is a solid member formed of glass or transparent plastic having an appropriate thickness. Reference laser beam L3 is incident on one surface of lightguiding block member 61, the other surface being held in smooth contact with hologram recording medium 3. Therefore, light-guiding block member 61 is provided with circular-arc surfaces 61a and 61b to bring the surface of light-guiding block member 61 into smooth contact with the hologram recording medium 3.

Cartridge 44 is provided with leaf spring 59 for urging transmissive substrate 58 of object-laser-beam incident unit 54 toward reference-laser-beam incident unit 55. When cartridge 44 is not loaded into holographic-stereogram producing apparatus 10, the leading end of hologram recording medium 3 is slightly exposed through the second unreeling opening 50. That is, by the elastic force of leaf spring 59, hologram recording medium 3 is held in a position corresponding to exposing and recording unit 49. Therefore, cartridge 44 secures hologram recording medium 3 in a position in which light is shielded therefrom.

After cartridge 44 has been loaded into holographicstereogram producing apparatus 10, a cam mechanism (not shown) removes leaf spring 59 from exerting pressure against hologram recording medium 3. As a result, cartridge 44 permits movement of hologram recording medium 3 from second unreeling opening 50 to recording-medium feeding mechanism 34 as desired. The force of leaf spring 59 is still used to exert a load to raise the object-laser-beam incident unit 54 and reference-laser-beam incident unit 55 to properly hold hologram recording medium 3. Spacer 60 insures proper spacing between object-laser-beam incident unit 54 and reference-laser-beam incident unit 55 for the passage of hologram recording medium 3 therebetween such that one surface of hologram recording medium 3 is maintained in smooth contact with the surface of light-guiding block member 61. Any device having attributes of a spring, such as a coil spring or other elastic means, may be employed in place of leaf spring 59. Hologram recording medium 3 is held by drive roller 40 and pinch roller 41 of recording-medium feeding mechanism 34. Hologram recording medium 3 is moved through exposing and recording unit 49 such that its surface is perpendicular to the optical axes of object-laser-beam optical system 15B and reference-laser-beam optical system 15C.

During use, a weak braking force is exerted by a breaking mechanism 53 on hologram recording medium 3 unreeled from light shielding cartridge case 45 hologram recording medium 3 is discharged from cartridge 44 such that the force for moving hologram recording medium 3 and force for braking are balanced. Braking mechanism 53, as shown in FIG. 5, includes a tension adjustment plate 63, a compression coil spring 64 and a slippage member 65 which are joined to support shaft 51 of core 46. Tension adjustment plate 63 is secured to support shaft 51. Slippage member 65 is pressed against partition plate 52 by the elastic force of compression coil spring 64 disposed in a compressed state between slippage member 65 and tension adjustment plate 63. Braking mechanism 53 adjusts the position at which tension adjustment plate 63 is secured to support shaft 51 to adjust the elastic force of compression coil spring 64.

The elastic force of compression coil spring 64 presses slippage member 65 against the partition plate 52 to exert a load against the rotation of support shaft 51. When stepping motor 42 rotates drive roller 40 to intermittently move hologram recording medium 3, braking mechanism 53 exerts a braking force on hologram recording medium 3. The elastic force of compression coil spring 64 is smaller than the rotational force of stepping motor 42. Therefore, braking mechanism 53 does not inhibit the movement of the hologram recording medium 3, but rather maintains the recording medium under tension. Therefore, braking mechanism 53 prevents the generation of vibrations except for when hologram recording medium 3 is moved. In cooperation with the S-shape recording-medium moving system, braking mechanism 53 prevents unwanted results, such as overrun of hologram recording medium 3 after it has been moved. Moreover, vibration of hologram recording medium 3 created by movement thereof can quickly be damped.

Core 46 formed as a solid structure made of a solid material. Hologram recording medium 3 can thus be tightly wound around core 46 so that tension exerted on hologram recording medium 3 by braking mechanism 53. Hologram recording medium 3 is joined to core 46 with a joint having a strength of 1 N or greater per a width of 10 mm and winding force of 1 N/cm or greater. Specifically, a tension of 200 gf (about 1.96 N) per a width of 10 mm is exerted on the hologram recording medium 3. Therefore, the strength of adhesive bonding with core 46 is 400 gf (about 3.92 N) or greater per a width of 10 mm. Moreover, hologram recording medium 3 is wound around core 46 with winding force of 300 gf/cm (about 2.94 N/cm) or greater. Thus, weak vibrations created during movement of hologram recording medium 3 are prevented.

Figure 6:
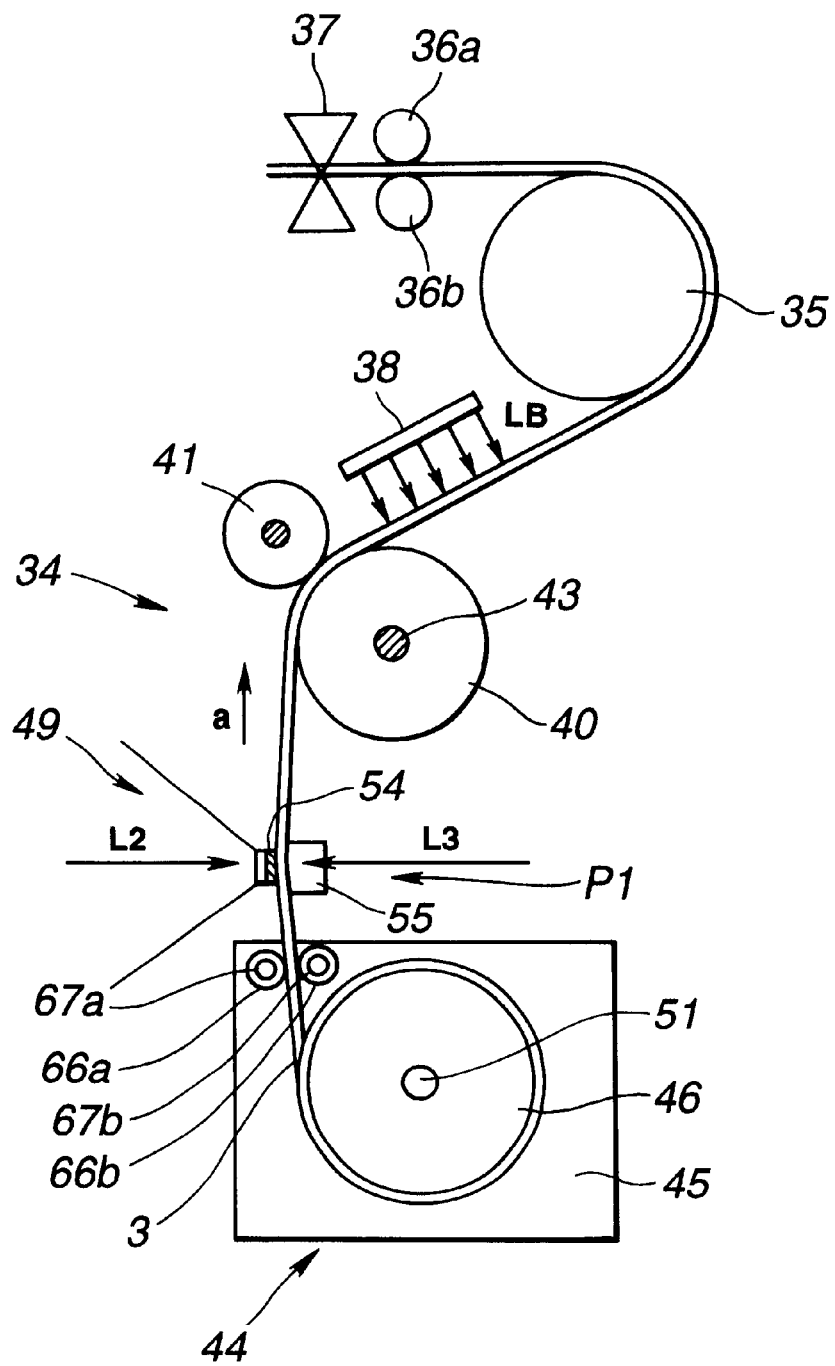
FIG. 6 is a plan view depicting a cartridge for a hologram-image recording medium loaded into a holographic-stereogram producing apparatus, each constructed in accordance with an additional embodiment of the invention, the recording-medium moving system including a pair of holding rollers provided in the cartridge.
Figure 7:
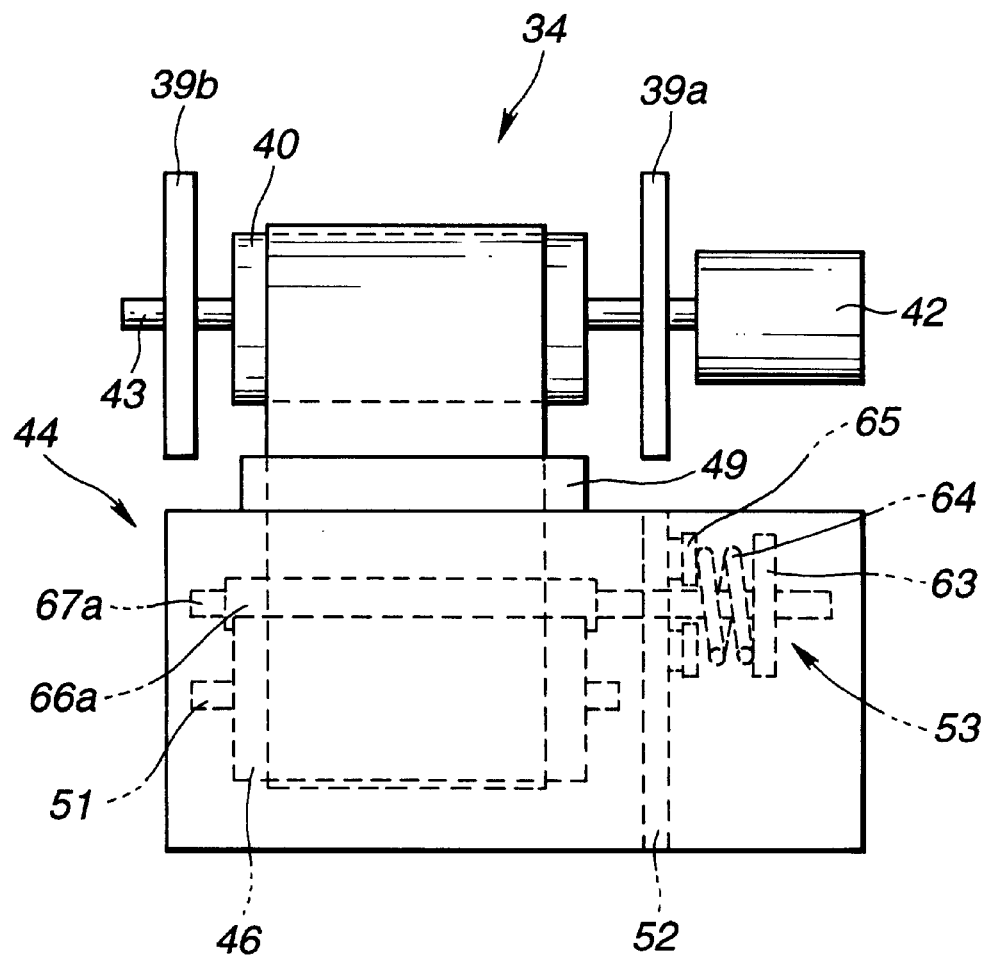
FIG. 7 is a front view showing the cartridge of FIG. 6, and including a braking mechanism provided for at least one of the holding rollers.

In an alternative embodiment of the invention, cartridge 44 may be formed with a pair of holding rollers 66a and 66b, as shown in FIGS. 6 and 7, fixed to shafts 67a and 67b respectively, and providing a braking force. Compression coil spring 64 and slippage member 65 as described above, may provide the braking force to shafts 67a and 67b. Alternatively, a static braking mechanism constituted by rubber or the like may be employed.

Figure 8:
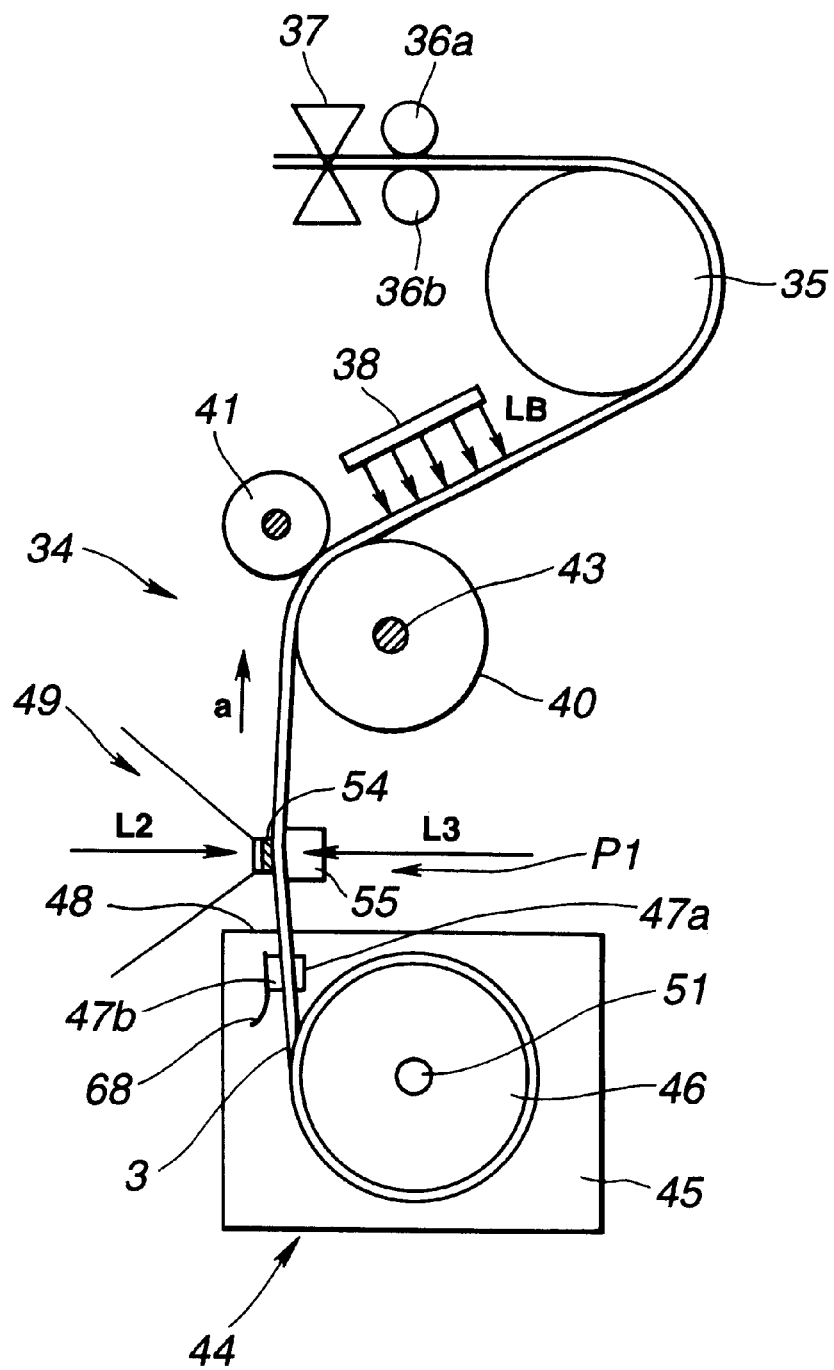
FIG. 8 is a plan view depicting a cartridge for a hologram-image recording medium loaded into a holographic-stereogram producing apparatus, each constructed in accordance with an additional embodiment of the invention, the recording-medium moving system including a pair of cleaning felt members disposed in the cartridge.

In a still further embodiment of the invention, a braking mechanism of cartridge 44 may include a leaf spring 68 in FIG. 8. Leaf spring 68 urges cleaning felt member 47b against secured cleaning felt member 47a in first unreeling opening 48 to hold hologram recording medium 3. The pair of cleaning felt members 47a and 47b clean hologram recording medium 3 and shield the same against light as it moves between the felt members. Also, a braking function can be realized by the felt members. Core 46 of cartridge 44 is therefore not required, as described above. The force of the pair of cleaning felt members 47a and 47b for holding hologram recording medium 3 is adjusted to provide proper tension.

Figure 14:
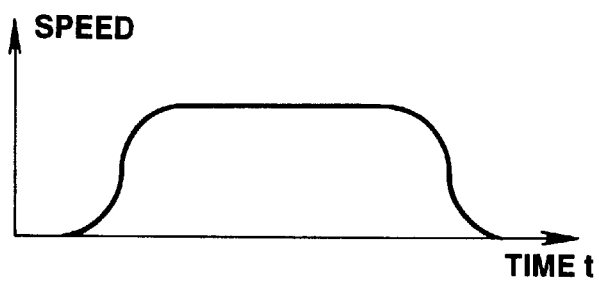
FIG. 14 is a graph showing change of movement speed of a hologram recording medium over time.

In holographic-stereogram producing apparatus 10, stepping motor 42 is intermittently rotated at uniform speed to move hologram recording medium 3. Then, the exposing and recording operation is performed after each intermittent movement has been completed and any generated vibrations have been attenuated. However, as shown in, for example, FIG. 14, hologram recording medium 3 may be gradually accelerated in an initial state, and then after being forwarded for a predetermined period of time at a constant speed, the speed is gradually decelerated and hologram recording medium 3 is stopped. Holographic-stereogram producing apparatus 10 employing such an acceleration and deceleration scheme and also employing either braking mechanism 53 or braking means incorporating the cleaning felt members 47a and 47b are able to prevent overrun of hologram recording medium 3. Moreover, vibrations of the overall body of the recording-medium moving system can reliably be prevented. Therefore, time required for vibrations to be attenuated can be shortened. As a result, holographic stereogram can be more efficiently produced.

During operation, it is preferable that time required from start of the operation of moving the recording medium to the completion of such movement be as constant as possible. However, the tension of the braking means is sometimes weakened because of expansion of hologram recording medium 3 occurring as time elapses, slippage of the various rollers and changes in power transmission, or changes to other characteristics, such as backlash of each element. Therefore, in order to account for these inconsistencies, holographic-stereogram producing apparatus 10 is structured such that hologram recording medium 3 is intermittently moved for a predetermined distance, and then a predetermined time is passed to wait for attenuation of vibrations before the exposing and recording operation is performed. Then, exposing and recording is performed. In this matter, it is guaranteed that the recording medium has been forwarded a proper amount.

As described above, cartridge 44 keeps light from hologram recording medium 3, and reliably prevents small vibrations during exposing and recording. As a result, stable interference fringes can be exposed and recorded on hologram recording medium 3. Cartridge 44 is formed into a unit structure in which the elements of exposing and recording unit 49, braking mechanism 53 and other elements noted above are provided as a single unit. Therefore, ease of the maintenance of holographic-stereogram producing apparatus 10 can be improved. It is important that the various elements, such as the exposing and recording unit and so forth, be properly positioned. Accordingly, locating means, such as pins and recesses, are provided on holographic stereogram producing apparatus 10 to receive the foregoing elements and cartridge 44 to permit easy insertion of the cartridge.

Figure 9:
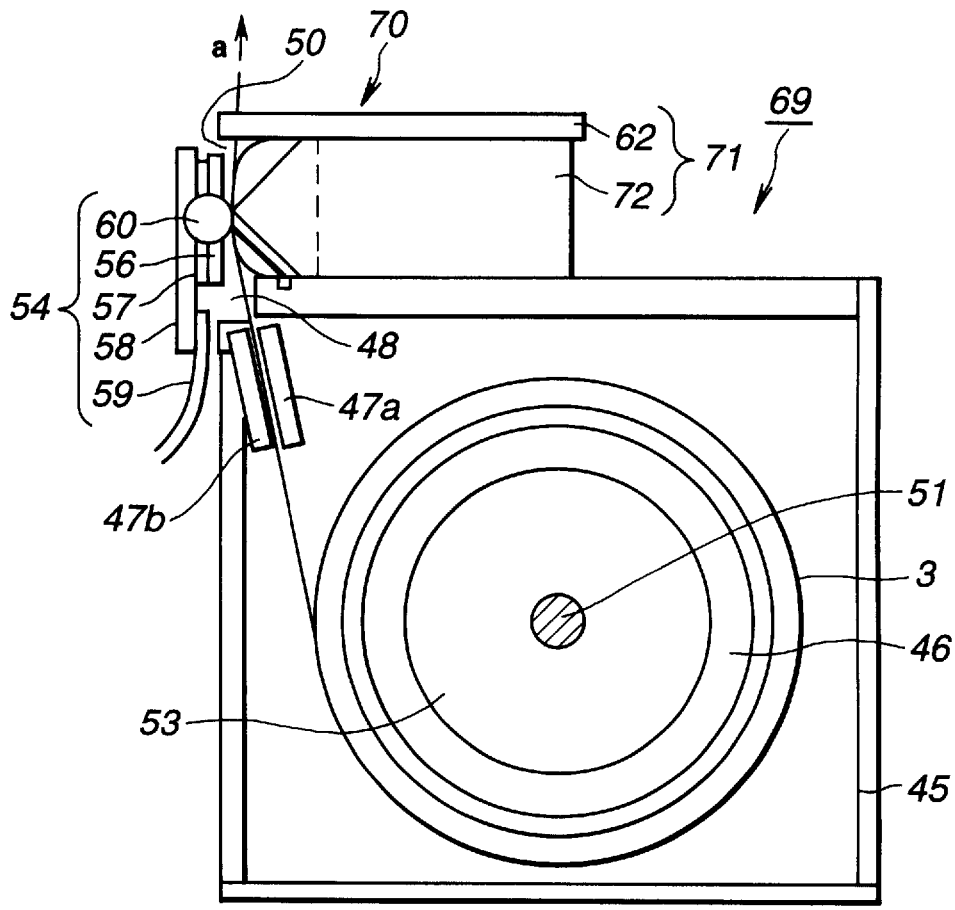
FIG. 9 depicts a cartridge for holding a hologram-image recording medium loaded into a holographic-stereogram producing apparatus, each being constructed in accordance with an additional embodiment of the invention.

Referring next to FIG. 9, another embodiment of the invention will now be described. A cartridge 69 including a hologram-image recording medium includes an index matching solution used during exposing and recording of the recording medium for reducing reflections between various optical elements by reducing the refractive index between them. Holographic-stereogram producing apparatus 10 sometimes encounters a problem if the refractive index of hologram recording medium 3 and light guide member 72 are considerably different. Reference laser beam L3 incident on the surface of hologram recording medium 3 at an acute angle may be totally reflected at the interface therebetween. The index matching solution cures this problem by making the refractive index of the recording medium and light guide member the same. Cartridge 69 includes structure similar to that of cartridge 44, similar elements are given the same reference numerals. These similar elements are omitted from description.

An exposing and recording unit 70 incorporates object-laser-beam incident unit 54 and a reference-laser-beam incident unit 71 to form an incidence portion for object laser beam L2 and reference laser beam L3 to be incident on hologram recording medium 3. Exposing and recording unit 70 is located adjacent light shielding cartridge case 45. Moreover, exposing and recording unit 70 holds hologram recording medium 3 in the widthwise direction for each portion of the hologram which is to be exposed and recorded. Exposing and recording unit 70 incorporates an index-matching-solution supply mechanism 73 (FIG. 10) for injecting index matching solution between the light guide member 72 and the hologram recording medium 3.

Figure 10:
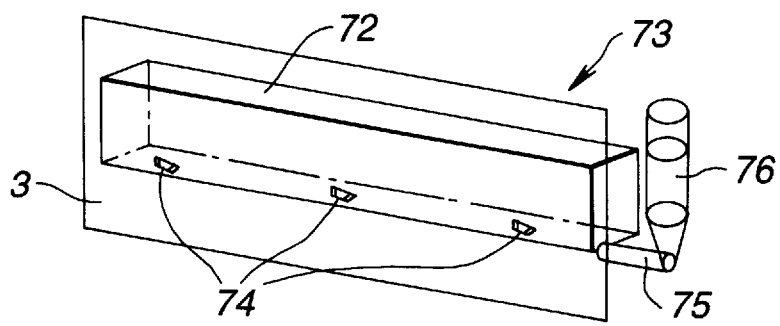
FIG. 10 is a perspective view of an index-matching-solution supply mechanism constructed in accordance with the invention.

As shown in FIG. 10, light guide member 72 is provided with a plurality of supply openings 74 formed in the surface thereof which are brought into contact with hologram recording medium 3. The supply openings 74 having a diameter of, for example, 1 mm or smaller. Supply openings 74 are connected to a solution tank 76 that holds index matching solution through a supply passage 75 formed in the lower surface of the light guide member 72. Index-matching-solution supply mechanism 73 has a closed fluid passage formed from supply openings 74 to solution tank 76. Solution having high volatility may be employed as the index matching solution and index-matching-solution supply mechanism 73 is able to prevent volatilization of the solution. In index-matching-solution supply mechanism 73, the balance between air pressure which is exerted on supply openings 74 and air pressure which is exerted on the level of solution in solution tank 76 prevents unnecessary discharge of the solution through supply openings 74. In index-matching-solution supply mechanism 73, supply openings 74 and supply passage 75 are typically disposed at positions displaced from the optical paths for the object laser beam L2 and the reference laser beam L3. However, if index matching can completely be performed, the supply openings 74 and the supply passage 75 may be provided at positions along the optical paths.

When hologram recording medium 3 has been loaded and thus brought into contact with light guide member 72, index matching solution is supplied through supply openings 74 by the surface tension thereof. Thus, the space between hologram recording medium 3 and light guide member 72 is filled with the index matching solution. As a result, vibrations which may be created during exposing and recording can be minimized. Therefore, the image quality of holographic stereogram produced by holographic-stereogram producing apparatus 10 can be improved. Additionally, holographic-stereogram producing apparatus 10 may use an edge lit method that employs a totally internally reflected reference beam having a steep angle of incidence at the edge of the recording medium. Other elements, such as the louvre film 56, can be removed, thus increasing the brightness of the hologram to expose and record the element hologram. The edge lit method is performed such that the index matching solution is maintained between the light guide member and the hologram recording medium to expose and record element hologram in the exposing and recording portion. Because index matching solution is interposed so that the hologram recording medium 3 and the light guide member 72 form an integrated unit, edge lit exposing and recording can satisfactorily be performed. Thus, the holographic-stereogram producing apparatus 10 is able to produce holographic stereogram having excellent image quality.

Index-matching-solution supply mechanism 73 is, together with exposing and recording unit 70, located and positioned by locating means, such as pins and recesses. Therefore, the index matching solution in an appropriate quantity, estimated from the amount of hologram recording medium 3 provided, is stored in solution tank 76 of cartridge 69. Thus, when cartridge 69 is changed to provide additional recording medium, index matching solution is also replenished. Therefore, cartridge 69 considerably improves the ease of maintenance of holographic-stereogram producing apparatus 10.

Figure 11:
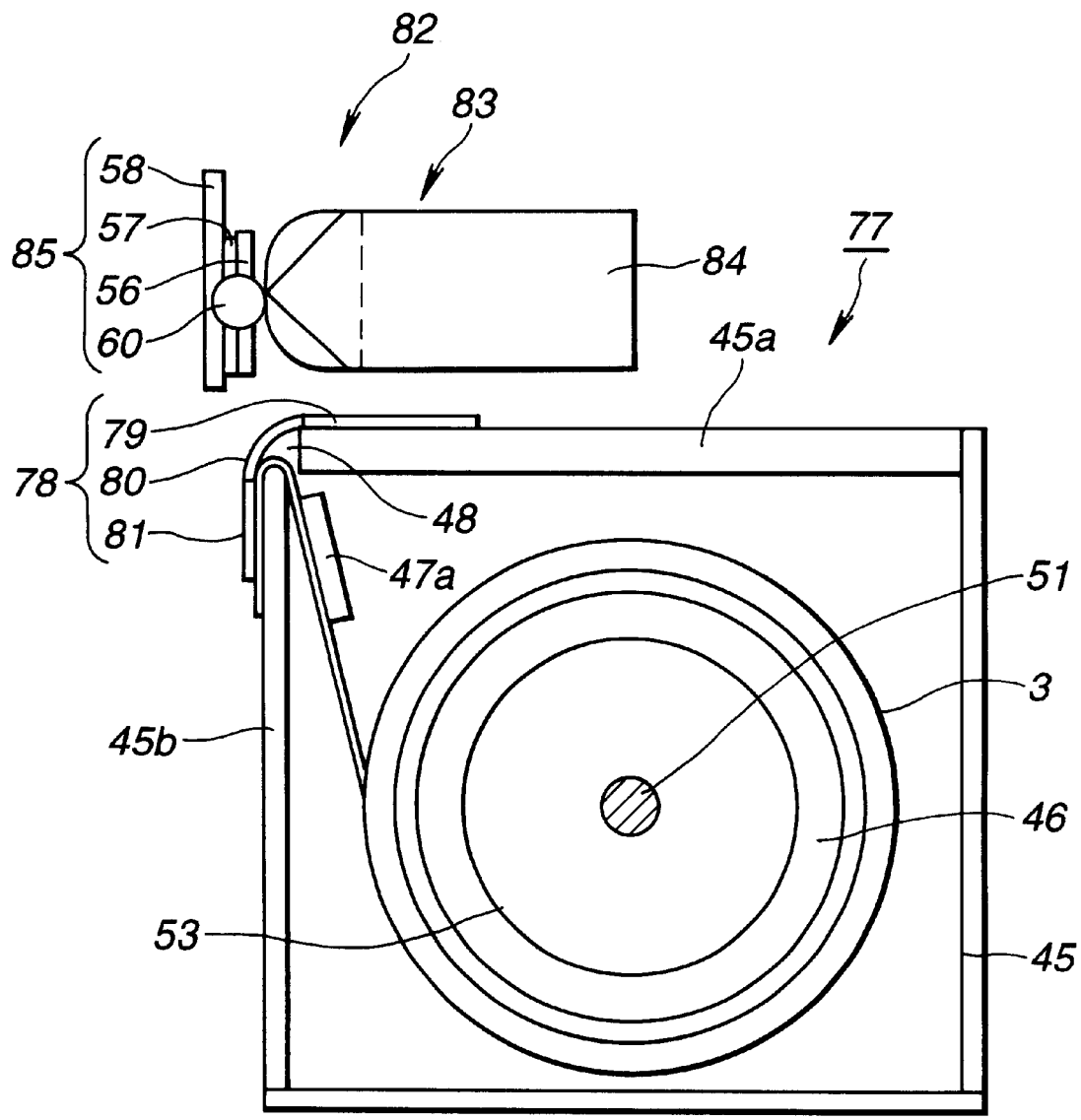
FIG. 11 depicts a cartridge for a hologram-image recording medium constructed in accordance with an additional embodiment of the invention which is not loaded into a holographic-stereogram producing apparatus and in which a protective film covers an unreeling opening.
Figure 12:
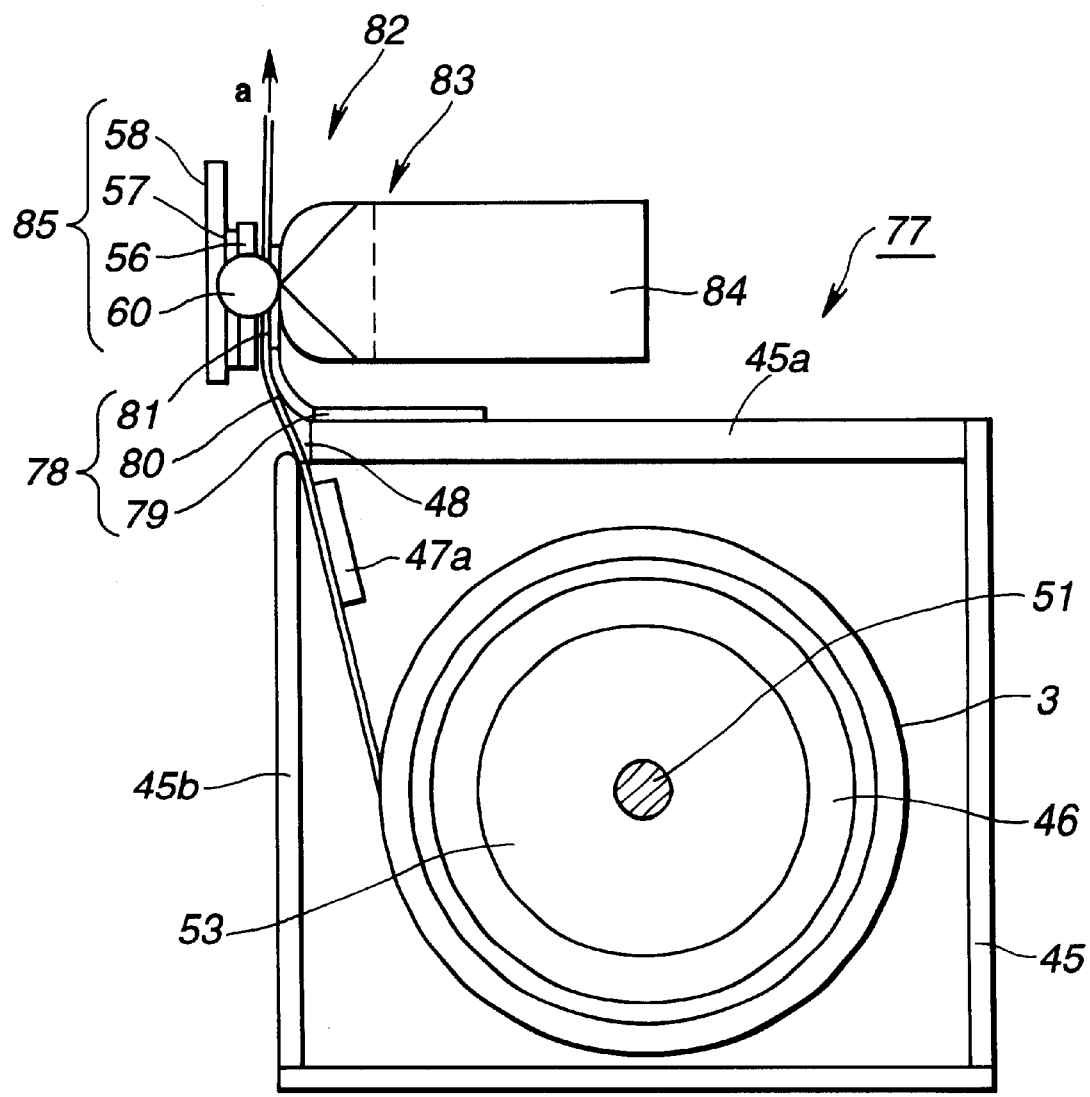
FIG. 12 depicts the cartridge of FIG. 11 for a hologram-image recording medium loaded into a holographic-stereogram producing apparatus, the protective film being positioned between the hologram recording medium and a light-guiding block member.

In yet another embodiment of the invention, a cartridge 77 for holding a hologram-image recording medium shown in FIGS. 11 and 12 does not include exposing and recording unit 49. Rather, a protective film 78 is provided. The other structures of cartridge 77 are similar to those of cartridge 44, similar elements are given similar reference numerals and are omitted from illustration.

Cartridge 77 is provided with protective film 78 disposed to cover first unreeling opening 48. Protective film 78 is composed of an adhesive film 79, a light-shielding film 80 and a light transmissive film 81. The foregoing elements are, in the foregoing sequential order, formed into one continuous element.

Adhesive film 79 is secured to a side surface 45a of light shielding cartridge case 45 of cartridge 77, reliably positioning protective film 78. Light-shielding film 80 is formed of a black and light impermeable material to prevent sensitization or exposure of hologram recording medium 3 accommodated in cartridge 77. Light transmissive film 81 is formed of a transparent material having a refractive index which is substantially the same as that of hologram recording medium 3 and of light-guiding block member 84 of reference laser beam incident unit 83 of exposing and recording unit 82. Therefore, light transmissive film 81 has excellent light permeability and is capable of preventing birefringence at the interface between hologram recording medium 3 and light-guiding block member 84.

Before being loaded into the holographic-stereogram producing apparatus 10, protective film 78 is disposed adjacent to first unreeling opening 48. Light-shielding film 80 covers first unreeling opening 48 to prevent sensitization of hologram recording medium 3 accommodated in cartridge 77. Light transmissive film 81 is positioned in close contact with the hologram recording medium 3, adhering itself and recording medium to a side surface 45b of cartridge 77.

When cartridge 77 including protective film 78 is loaded into holographic-stereogram producing apparatus 10, hologram recording medium 3 and light transmissive film 81 are separated from side surface 45b, opening first unreeling opening 48, as shown in FIG. 12. Because cartridge 77 is shielded against light when loaded into holographic-stereogram producing apparatus 10, opening of first unreeling opening 48 does not cause the hologram recording medium 3 to be sensitized.

One surface of separated light transmissive film 81 is positioned in contact with hologram recording medium 3. Moreover, light transmissive film 81 is positioned adjacent hologram recording medium 3 between object-laser-beam incident unit 85 and reference laser beam incident unit 83. The other surface of light transmissive film 81 is positioned in contact with light-guiding block member 84 of reference laser beam incident unit 83. Thus, light transmissive film 81 is held between hologram recording medium 3 and light-guiding block member 84. Hologram recording medium 3 slides relative to the surface of the light transmissive film 81 during movement, light transmissive film 81 maintaining its position. As a result, the image quality of the holographic stereogram which is produced by holographic-stereogram producing apparatus 10 can be improved.

During operation, protective film 78 may be damaged. Protective film 78 is changed automatically with change of cartridge 77. Therefore, maintenance of holographic-stereogram producing apparatus 10 is easily performed. Additionally, protective film 78 may be coated with a hard coat layer or made of glass or the like to improve the durability thereof. Additionally, if a mechanism for supplying the index matching solution to both or either surface of protective film 78 is provided for cartridge 77 (as described above), the durability of protective film 78 can be further improved. Because the positional relationship between elements such as cleaning felt member 47a, cartridge 77 and other elements of holographic-stereogram producing apparatus 10, locating means, such as pins and recesses, are provided to permit easy insertion and removal of the cartridge.

Figure 13:
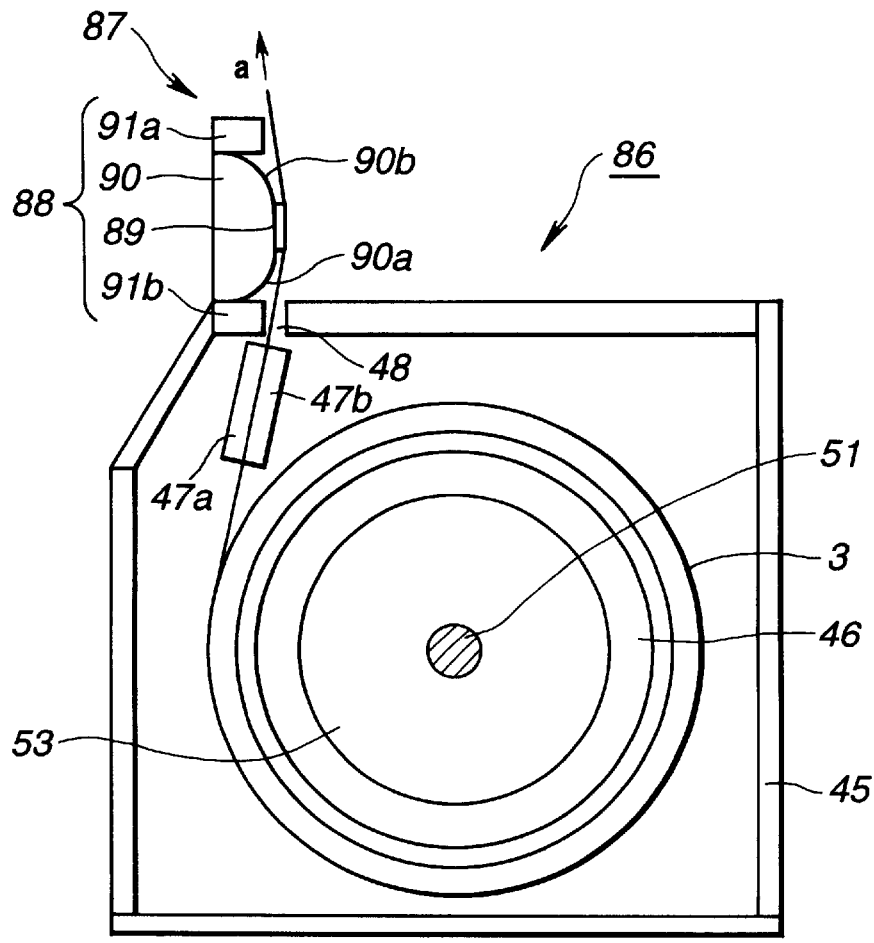
FIG. 13 depicts a cartridge for a hologram-image recording medium, including a light-guiding block member, loaded into a holographic-stereogram producing apparatus, each being constructed in accordance with an additional embodiment of the invention.

In accordance with a still further embodiment of the invention, a cartridge 86 for storing a hologram-image recording medium 3 is provided as shown in FIG. 13. Therefore, similar elements to those of cartridge 44 are given the same reference numerals, and are omitted from description.

Cartridge 86 includes a light-guiding block member 90 functioning as exposing and recording unit 87 disposed in a portion of the apparatus on which object laser beam L2 is incident. Because exposing and recording unit 87 is provided integral with cartridge 86, it can simultaneously be changed when the cartridge 86 is changed. Therefore, ease of maintenance is improved.

Exposing and recording unit 87 incorporates an object-laser-beam incident unit 88 on which object laser beam L2 is incident. Object-laser-beam incident unit 88 incorporates a one-dimensional diffusion plate 89, a light-guiding block member 90 and light-shielding substrates 91a and 91b. Light-guiding block member 90 is formed integral with one-dimensional diffusion plate 89 bonded thereto. Light-guiding block member 90 is formed with light shielding substrate 91a on the upper surface thereof to prevent unnecessary external light.

Object-laser-beam incident unit 88 is also formed with light-shielding substrate 91b joined to serve as one side wall of light shielding cartridge case 45, and which also defines first unreeling opening 48 of cartridge 86. Object-laser-beam incident unit 88 is provided such that the surface of hologram recording medium 3 is positioned perpendicular to the optical axes of object-laser-beam optical system 15B and the reference-laser-beam optical system 15C in the exposing and recording portion P1. Thus, cartridge 86 is not required to be provided with a special mechanism for bringing exposing and recording unit 87 into intimate contact with the hologram recording medium 3. Light-shielding substrate 91b prevents incidence of object laser beam L2 on the light-guiding block member 90 and further prevents other laser beams from reaching inside light shielding cartridge case 45.

Alternatively, cartridge 86 may not include exposing and recording unit 87 formed integral therewith. A structure similar to that of FIGS. 11 and 12 may be employed.

The invention is not limited to the foregoing structures. For example, a structure formed by combining a plurality of the embodiments with one another may be employed. A structure formed by using only portions of the structures of the embodiments may also be employed. Indeed, a cartridge for a hologram-image recording medium employing any of the characteristics noted above may be employed within the scope and spirit of the present invention.

While the holographic-stereogram producing apparatus 10 into which the cartridge for a hologram-image recording medium is loaded exposes and records holographic stereogram having only parallax information in the lateral direction (so-called Horizontal Parallax Only). As a matter of course, the present invention may also be applied to holographic stereogram (so-called Full Parallax) having parallax information in the lateral direction and the vertical direction. In such an alternative apparatus, the object laser beam and the reference laser beam are converted into a dot shape instead of an oblong shape by two cylindrical lenses. Moreover, the hologram recording medium is moved in two directions to the converging position to expose and record the image.

While the holographic-stereogram producing apparatus 10 exposes and records monochrome element hologram images on the hologram recording medium 3, the present invention is not limited to such a holographic-stereogram producing apparatus. The holographic-stereogram producing apparatus may be provided with, for example, three primary colors, that is, red, green and blue laser beam sources. Moreover, optical systems and liquid crystal display units corresponding to the laser beam sources may be provided. Thus, the apparatus can expose and record color synthesized element hologram images on the hologram recording medium 3.

As described above, the cartridge for a hologram-image recording medium according to the present invention is pictured such that the hologram recording medium is maintained within a light shielding cartridge that is loaded in the holographic-stereogram producing apparatus. Therefore, elements which require maintenance are simultaneously changed when the hologram recording medium is replenished after a predetermined number of holographic stereogram have been produced. Therefore, performance is improved, and maintenance is performed with ease. Moreover, accurate holographic-stereogram can be produced.

It will thus be seen that the objects set forth above, among those made apparent from the preceding description, are efficiently attained and, because certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of all of the generic and specific features of the invention hereindescribed and all statements of the scope of the invention which, as a matter of language, might be said to fall therebetween.

What is claimed is:

1. A cartridge for holding a hologram recording medium for use with a hologram-image recording apparatus said hologram-image recording apparatus including locating means for positioning said cartridge, and a recorder for sequentially exposing and recording interference fringes generated by a combination of an object laser beam modulated in accordance with an image and a reference laser beam having coherency with respect to the object laser beam, said cartridge comprising:

a light shielding case for shielding external light from inside said cartridge, and defining an unreeling opening;

a core positioned within said cartridge around which said hologram recording medium is wound, wherein a loose end of said hologram recording medium is unreeled from said core to an exposing and recording portion of said hologram-image recording apparatus through said unreeling opening when said cartridge is mounted on said hologram-image recording apparatus; and a braking mechanism coupled with said core, said braking mechanism braking movement of said hologram recording medium being unreeled by imparting a load on said core against movement of said hologram-recording medium.

2. The cartridge according to claim 1, further comprising receiving means provided integral with said light shielding case so as to be engaged with said locating means when the cartridge is mounted on said hologram-image recording apparatus.

3. The cartridge according to claim 1, further comprising an optical element for directing light beams provided with said light shielding case, and wherein said object laser beam or said reference laser beam is incident on said hologram-recording medium through said optical element while said cartridge is mounted on said hologram-image recording apparatus.

4. The cartridge according to claim 3, wherein the optical element is a light-guiding block member formed of glass.

5. The cartridge according to claim 4, wherein the light-guiding block member is formed with a supplying portion and an unreeling portion, surfaces of the supplying portion and the unreeling portion being formed with a circular-arc structure to be maintained in contact with said hologram-image recording medium.

6. The cartridge according to claim 4, further comprising block member locating means provided for said light-guiding block member such that said light-guiding block member engages said hologram-image recording apparatus when said cartridge is mounted on the hologram-image recording apparatus.

7. The cartridge according to claim 3, wherein the optical element is detachable with respect to the light shielding case.

8. The cartridge according to claim 3, wherein the optical element has a refractive index which is different from the refractive index of the hologram recording medium by 0.2 or smaller.

9. The cartridge according to claim 1, further comprising a translucent film member disposed at said unreeling opening defined by said light shielding case for closing said unreeling opening portion when said cartridge is not mounted on said hologram-image recording apparatus, said translucent film member guiding said hologram-image recording medium to the exposing and recording portion when said cartridge is mounted on said hologram-image recording apparatus.

10. The cartridge according to claim 9, wherein said translucent film member is positioned adjacent said unreeling opening portion for shielding external light when said cartridge is not mounted on said hologram-image recording apparatus.

11. The cartridge according to claim 1, further comprising a diffusion plate positioned opposite to the exposing and recording portion when said cartridge is mounted on said hologram-image recording apparatus for diffusing said object laser beam which is incident on said hologram-recording medium.

12. The cartridge according to claim 1, further comprising an optical element arranged opposite to said exposing and recording portion for limiting an incident angle of said object laser beam or said reference laser beam when said cartridge is mounted on said hologram-image recording apparatus.

13. The cartridge according to claim 1, wherein said core is formed as a rigid core, said hologram recording medium being joined to the outer surface of the rigid core with a joint strength of 1N or greater per 10 mm width.

14. The cartridge according to claim 13, wherein said hologram recording medium is wound around the outer surface of said rigid core with a winding force of 1N/cm or greater.

15. The cartridge according to claim 1, wherein said unreeling opening includes cleaning means for cleaning the hologram-image recording medium.

16. The cartridge according to claim 15, wherein said cleaning means shields the unreeling opening against external light entering said cartridge.

17. The cartridge according to claim 1, wherein said light shielding case has a solution supplying means for supplying index matching solution to the hologram-image recording medium when said hologram-image recording image is being unwound from said core to said exposing and recording portion.

18. The cartridge according to claim 1, wherein said braking mechanism comprises cleaning means positioned adjacent to said unreeling opening.

19. The cartridge according to claim 1, wherein said braking mechanism comprises a pair of rollers situation within said cartridge and adjacent to said unreeling opening.

20. The cartridge according to claim 1, wherein said braking mechanism is provided as an optical element urged in a direction of said hologram recording medium after passing from said unreeling opening.

* * * * *